United States Patent
D'Agostino

(10) Patent No.: US 11,601,390 B2
(45) Date of Patent: *Mar. 7, 2023

(54) SYSTEM AND METHOD FOR TAGGING DATA

(71) Applicant: The Toronto-Dominion Bank, Toronto (CA)

(72) Inventor: Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,566

(22) Filed: Dec. 22, 2021

(65) Prior Publication Data

US 2022/0116348 A1  Apr. 14, 2022

Related U.S. Application Data

(63) Continuation of application No. 16/890,428, filed on Jun. 2, 2020, now Pat. No. 11,245,656.

(51) Int. Cl.
*H04L 51/42* (2022.01)
*G06Q 30/02* (2012.01)
(Continued)

(52) U.S. Cl.
CPC ......... *H04L 51/42* (2022.05); *G06Q 30/0239* (2013.01); *H04L 51/18* (2013.01); *H04L 51/224* (2022.05)

(58) Field of Classification Search
CPC ......... H04L 51/22; H04L 51/18; H04L 51/24; H04L 51/32; H04L 67/1082;
(Continued)

(56) References Cited

U.S. PATENT DOCUMENTS 7,143,089 B2  11/2006  Petras et al.
7,194,422 B1   3/2007  St. John Killick
(Continued)

OTHER PUBLICATIONS

Klede-Schnabel, W. et al.; Customer Loyalty Programs in Fashion Retail—A Change from Multichannel to Omnichannel; Reutlingen University 2016, Reutlingen; pp. 1-25; https://publlkationen.reutlingen-university.de/files/1376/1376.pdf; retrieved from the Internet May 1, 2020.

(Continued)

*Primary Examiner* — Sargon N Nano
(74) *Attorney, Agent, or Firm* — CPST Intellectual Property Inc.; Brett J. Slaney

(57) ABSTRACT

A system and method are provided for tagging data. The method is executed by a device having a communications module and includes providing via the communications module, to a client device, an option to associate tags with an event, the option providing at least one automatically determined tag based on: i) the event, ii) an entity associated with the client device, or iii) stored tag data associated with a plurality of client devices. The method also includes receiving via the communications module, from the client device, at least one tag added by the client device, and associating the at least one tag with the event and store the association with the stored tag data. The method also includes enabling via the communications module, the at least one tag to be displayed in a user interface comprising a listing of events, and using the at least one tag in executing a follow up action associated with the client device.

20 Claims, 16 Drawing Sheets

(51) Int. Cl.
*G06Q 30/0207* (2023.01)
*H04L 51/18* (2022.01)
*H04L 51/224* (2022.01)

(58) Field of Classification Search
CPC ..... H04L 12/496; H04L 51/42; H04L 51/224; G06Q 30/0239
See application file for complete search history.

(56) References Cited

U.S. PATENT DOCUMENTS

| | | | |
|---|---|---|---|
| 7,428,988 B1* | 9/2008 | Starr | G06Q 30/06 235/383 |
| 8,006,901 B2* | 8/2011 | Sato | G07G 1/0054 705/16 |
| 8,010,618 B1* | 8/2011 | Purcell | G06F 13/4022 709/213 |
| 8,849,686 B2 | 9/2014 | Albisu | |
| 8,930,236 B2 | 1/2015 | Gillenson et al. | |
| 9,002,728 B2 | 4/2015 | Carpenter et al. | |
| 9,294,431 B2 | 3/2016 | Frazier | |
| 9,402,104 B2 | 7/2016 | John | |
| 9,542,690 B2 | 1/2017 | Tiku et al. | |
| 9,626,690 B2 | 4/2017 | Qu | |
| 9,646,027 B2 | 5/2017 | Zuckerberg | |
| 9,786,005 B1 | 10/2017 | Poursartip | |
| 9,799,173 B2* | 10/2017 | Pedley | G06Q 20/208 |
| 10,121,033 B1* | 11/2018 | Robshaw | G06K 7/10198 |
| 10,157,400 B1 | 12/2018 | Georgi | |
| 10,176,201 B2* | 1/2019 | Johnson | G06F 16/387 |
| 10,339,553 B2 | 7/2019 | Ovick et al. | |
| 10,482,519 B1* | 11/2019 | Bharadwaj | G06Q 30/0631 |
| 10,528,234 B2 | 1/2020 | Brown | |
| 10,672,020 B1* | 6/2020 | Reynolds | G06Q 30/0236 |
| 10,909,525 B1* | 2/2021 | Dhodapkar | G06Q 20/3278 |
| 11,010,371 B1 | 5/2021 | Slomka | |
| 11,093,963 B2* | 8/2021 | Zimmermann | G06Q 30/0231 |
| 2005/0177507 A1* | 8/2005 | Bandych | G06Q 20/10 705/40 |
| 2005/0216373 A1* | 9/2005 | Weiss | G06Q 10/087 705/28 |
| 2007/0132779 A1* | 6/2007 | Gilbert | G06F 8/20 345/619 |
| 2007/0194112 A1* | 8/2007 | Petroskey | G06Q 30/04 705/16 |
| 2008/0183816 A1 | 7/2008 | Morris | |
| 2009/0005067 A1 | 1/2009 | Ernst | |
| 2009/0300547 A1* | 12/2009 | Bates | G06F 16/954 707/999.005 |
| 2009/0319623 A1 | 12/2009 | Srinivasan | |
| 2011/0145275 A1 | 6/2011 | Stewart | |
| 2011/0145327 A1 | 6/2011 | Stewart | |
| 2011/0202531 A1 | 8/2011 | Zuckerberg | |
| 2012/0030232 A1 | 2/2012 | John | |
| 2012/0030292 A1 | 2/2012 | John | |
| 2012/0284105 A1 | 11/2012 | Lehmann | |
| 2012/0323636 A1 | 12/2012 | Albisu | |
| 2013/0212192 A1 | 8/2013 | Yerli | |
| 2013/0222133 A1 | 8/2013 | Schultz | |
| 2013/0232189 A1 | 9/2013 | Lewis | |
| 2014/0365301 A1 | 12/2014 | Rappoprt et al. | |
| 2015/0095144 A1 | 4/2015 | Soloff | |
| 2015/0113524 A1 | 4/2015 | Jonnala | |
| 2015/0220951 A1 | 8/2015 | Kurapati et al. | |
| 2016/0012465 A1* | 1/2016 | Sharp | G06Q 20/321 705/14.17 |
| 2016/0026367 A1 | 1/2016 | Brown | |
| 2016/0142783 A1 | 5/2016 | Bagga | |
| 2016/0171202 A1 | 6/2016 | Goad | |
| 2016/0269334 A1* | 9/2016 | Desouza Sana | H04L 51/18 |
| 2018/0121420 A1* | 5/2018 | Onusko | G06F 40/295 |
| 2019/0130429 A1 | 5/2019 | Roy | |
| 2020/0005347 A1 | 1/2020 | Boal | |
| 2020/0097992 A1* | 3/2020 | Hasan | G06Q 30/0226 |
| 2020/0201775 A1* | 6/2020 | Zhang | G06F 16/182 |
| 2020/0320505 A1* | 10/2020 | Crooks | G06Q 20/3278 |
| 2021/0342664 A1* | 11/2021 | Balgañán | H04W 12/069 |
| 2021/0374797 A1* | 12/2021 | Hasan | G06Q 50/01 |

OTHER PUBLICATIONS

Rigby, D. et al., Are consumers waiting for better deals?, Bain Retail Holiday Newsletter Issue No. 4, pp. 1-20, https://www.bain.com/contentassets/4f584db888864a3ba349d464459b8f66/bain_brief_retail_holiday_newsletter_234_2012-2013.pdf; retrieved from the internet May 1, 2020.

Tsujimori, T. et al.; History-based Incentive for Crowd Sensing; ACM—IWWISS'4 Sep. 1-2, 2014, pp. 1-6; https://dl.acm.org/doi/pdf/10.1145/2637064.2637089; retrieved from the Internet May 1, 2020.

U.S. Appl. No. 16/890,428, filed Jun. 2, 2020.

* cited by examiner

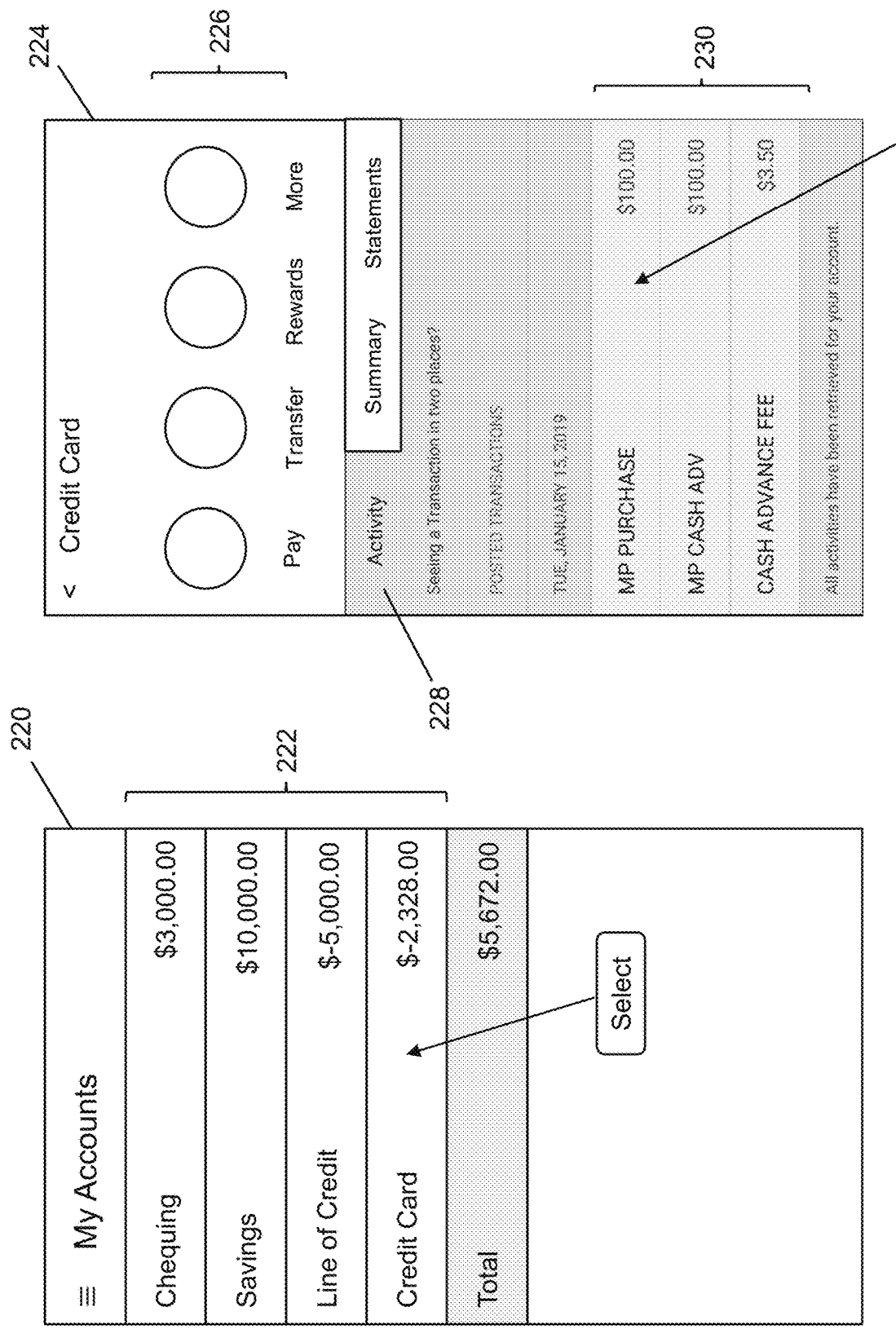

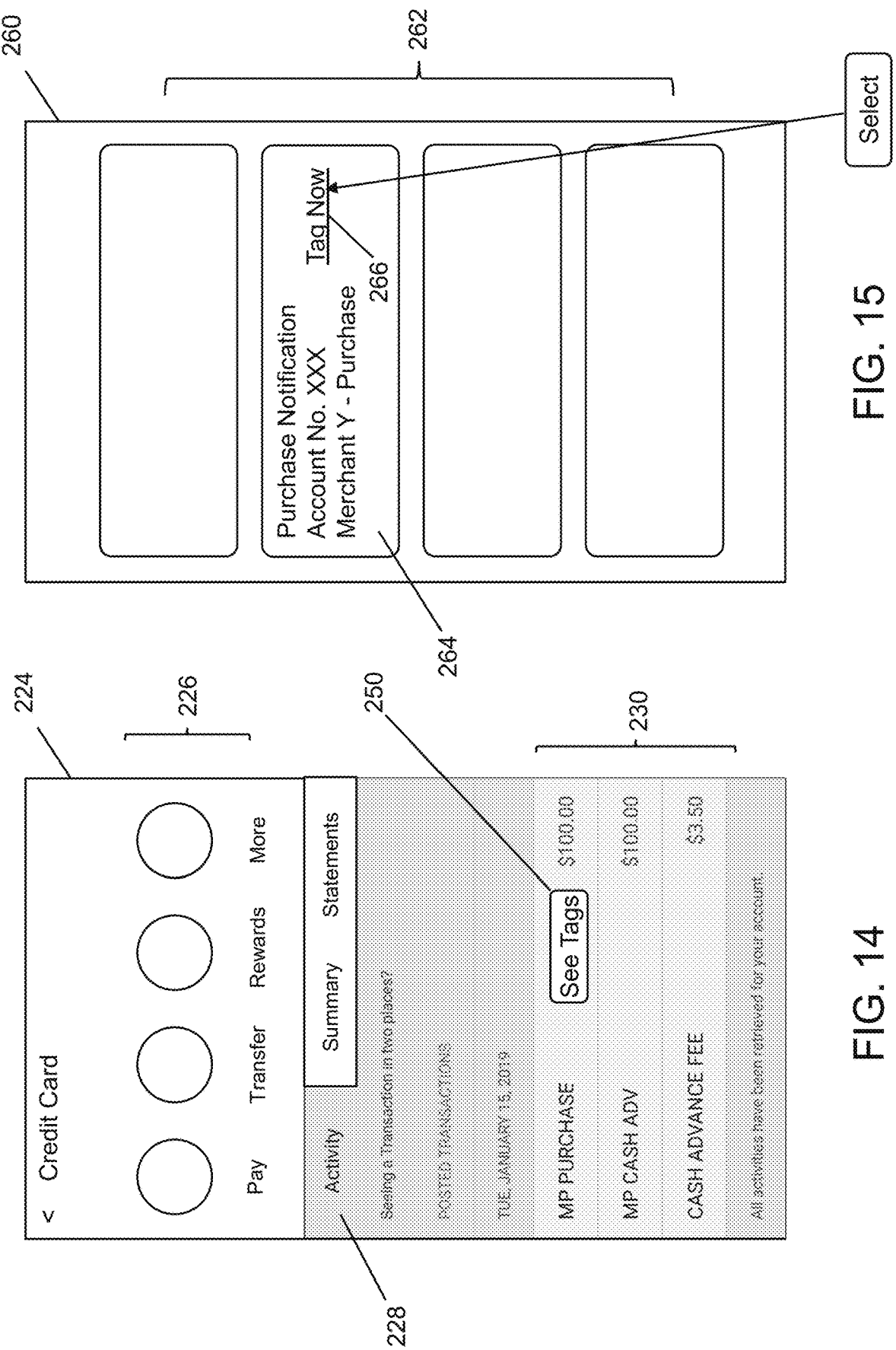

SYSTEM AND METHOD FOR TAGGING DATA

CROSS-REFERENCE TO RELATED APPLICATIONS

This application is a Continuation of U.S. patent application Ser. No. 16/890,428 filed on Jun. 2, 2020, entitled "System and Method for Tagging Data" and the entire contents of which is incorporated herein by reference.

TECHNICAL FIELD

The following relates generally to tagging data.

BACKGROUND

Events or actions, such as financial transactions, may be recorded or captured as entries in a statement, log, ledger, table, or list. Often, such events or actions are associated with an account associated with a user and that user can access the statement, log, ledger, table, or list in a graphical user interface provided through a web browser login, application (app) or both.

For example, account information for certain types of financial products (e.g., a chequing or savings account, a line of credit, or a credit card) may include a transaction history and can capture events that occur within a period of time, e.g., through monthly statements. Typically, the transaction history provides limited information associated with the transaction, such as the location at which a purchase was made, and the amount paid for that purchase. Moreover, a vendor's billing name may be unrecognizable (e.g., a numbered corporation) and it can be difficult to recall what was actually purchased based on the date and amount alone. This can cause confusion between legitimate and fraudulent transactions.

When reviewing a transaction history or other logs of events, such limited information can make it difficult to recall why a purchase was made, or to recall other contextual information about the individual entries. Solutions have been contemplated for supplementing transaction histories with additional information. However, managing and using such additional information can become a nuisance to users if too much additional effort is required. Moreover, if the additional information is captured but not effectively used, the effort and additional data storage required for capturing the information may be wasted.

BRIEF DESCRIPTION OF THE DRAWINGS

Embodiments will now be described with reference to the appended drawings wherein:

FIG. 10 is an example of a graphical user interface for an accounts summary page of a financial institution application.

FIG. 11 is an example of a graphical user interface for an account details page of a financial institution application.

FIG. 14 is an example of a graphical user interface for an account details page of a financial institution application showing a tag notification in association with a transaction entry.

FIG. 15 is an example of a graphical user interface for a notifications view showing a transaction notification with tagging option.

DETAILED DESCRIPTION

Figure 1:
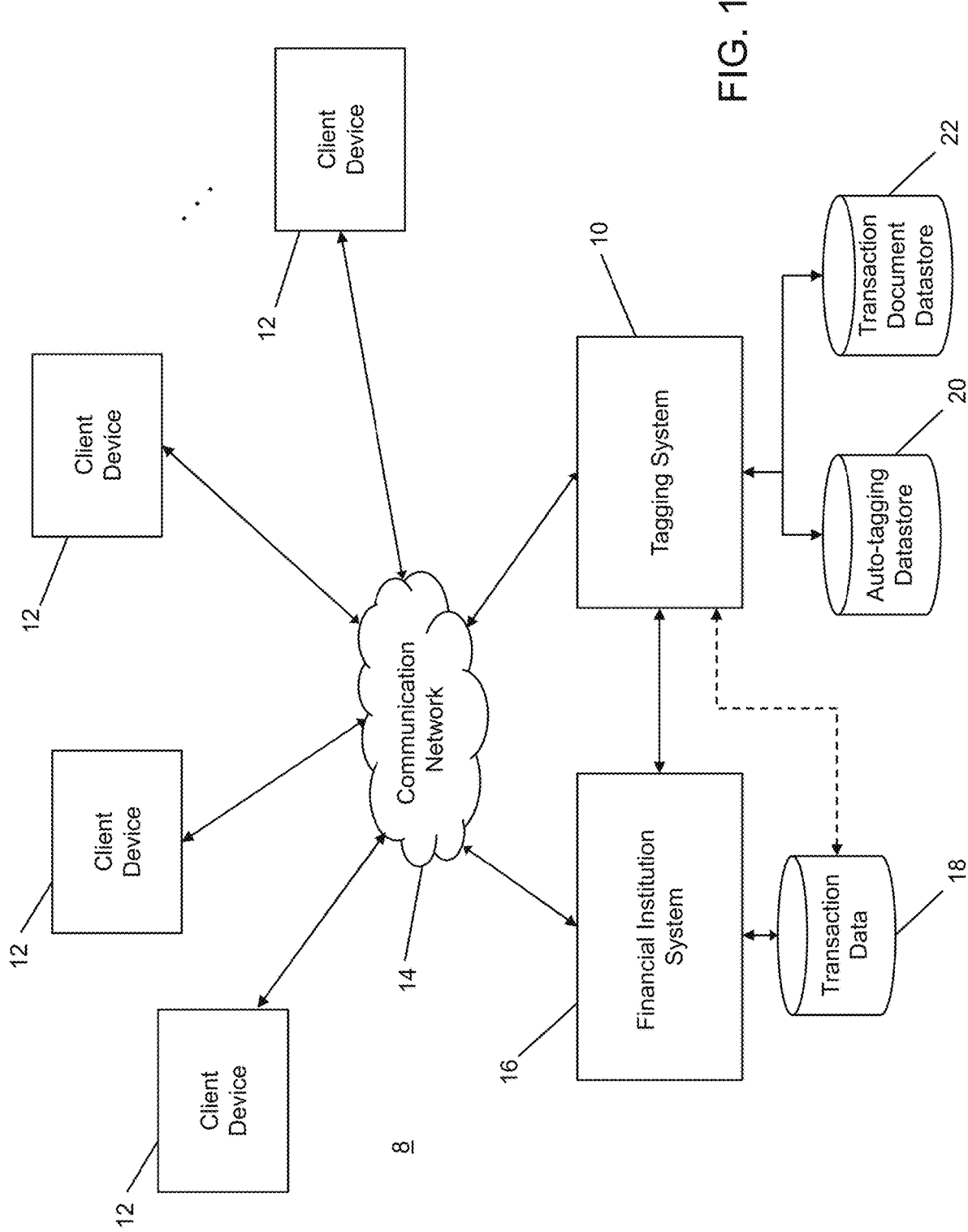
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

When provided with a transaction history having limited associated information, it can be difficult to recall why a purchase was made or other contextual information about the individual entries. That is, while a transaction entry in a transaction history or statement provides some identifying information, the user typically does not have access to, or a way to augment, this limited information with additional information, notes, or other useful content. Such additional content would be advantageous for organizing financial data, conducting searches associated with the financial data, and determining associations between users, entities, products, locations, services and other elements.

A system is described herein that leverages access to transaction summaries or notifications regarding transactions, to provide users with an opportunity to further enhance their search capabilities, among other things, by tagging the transactions. For example, grocery transactions can be tagged with keywords such as "apples", "oranges", "milk", etc. In this way, users can find past transactions, particularly those with poor descriptions, more easily. With a tagging structure in place, customers can define their own classification scheme and/or the underlying system can learn in real-time to automatically tag the transaction. That is, customers can tag transactions at the point they occur, the system can learn customer tagging over time, and a "people like you" scheme can be used to suggest tags for certain transactions. An auto tagging system is described herein that allows the tags to be built/created, stored, and leveraged in order to use the tags for subsequent searching and to generate targeted messages such as targeted rewards.

In another aspect, the presently described system can provide enhanced tagging features such as imparting hierarchical structures to tags, bundling multiple transactions with similar tags, applying transaction formulas, and implementing transaction-related scripts.

It will be appreciated that while examples provided herein are directed to financial transactions and financial histories and statements, the principles discussed herein equally apply to other events or actions, such as user or data activity logs, access control logs, mobile phone statements, utility consumption statements, etc.

Certain example systems and methods described herein are able to tag data and/or facilitate the automatic tagging of data. In one aspect, there is provided a device for tagging data. The device includes a processor, a communications module coupled to the processor, and a memory coupled to the processor. The memory stores computer executable instructions that when executed by the processor cause the processor to provide via the communications module, to a client device, an option to associate tags with an event, the option providing at least one automatically determined tag based on: i) the event, ii) an entity associated with the client device, or iii) stored tag data associated with a plurality of client devices. The memory also stores computer executable instructions that when executed by the processor cause the processor to receive via the communications module, from the client device, at least one tag added by the client device; and associate the at least one tag with the event and store the association with the stored tag data. The memory also stores computer executable instructions that when executed by the processor cause the processor to enable via the communications module, the at least one tag to be displayed in a user interface comprising a listing of events; and use the at least one tag in executing a follow up action associated with the client device.

In another aspect, there is provided a method of tagging data. The method is executed by a device having a communications module. The method includes providing via the communications module, to a client device, an option to associate tags with an event, the option providing at least one automatically determined tag based on: i) the event, ii) an entity associated with the client device, or iii) stored tag data associated with a plurality of client devices. The method also includes receiving via the communications module, from the client device, at least one tag added by the client device; and associating the at least one tag with the event and store the association with the stored tag data. The method also includes enabling via the communications module, the at least one tag to be displayed in a user interface comprising a listing of events; and using the at least one tag in executing a follow up action associated with the client device.

In another aspect, there is provided non-transitory computer readable medium for tagging data. The computer readable medium includes computer executable instructions for providing via a communications module, to a client device, an option to associate tags with an event, the option providing at least one automatically determined tag based on: i) the event, ii) an entity associated with the client device, or iii) stored tag data associated with a plurality of client devices. The computer readable medium also includes computer executable instructions for receiving via the communications module, from the client device, at least one tag added by the client device; and associating the at least one tag with the event and store the association with the stored tag data. The computer readable medium also includes computer executable instructions for enabling via the communications module, the at least one tag to be displayed in a user interface comprising a listing of events; and using the at least one tag in executing a follow up action associated with the client device.

In certain example embodiments, the option can be provided in response to determining that the event has occurred. The option may be provided using a notification pushed to the client device.

In certain example embodiments, the option to associate tags with the event can be provided after detecting that the client device has accessed the user interface comprising the listing of events.

In certain example embodiments, the follow up action can include a targeted message sent to the client device based on the at least one tag or the event. The targeted message can include a reward, offer, or promotion. Tags can be sent to an external merchant system associated with the event and data augmented with the reward, offer, or promotion that is to be provided to the client device can be received from the external merchant system.

In certain example embodiments the follow up action can include accessing the stored tag data to enable a search of the stored tag data or the listing of events.

In certain example embodiments, the client device can be enabled to apply tags to the event in a hierarchal structure.

In certain example embodiments, the client device can be enabled to associate tags to a bundle of multiple transactions at the same time.

In certain example embodiments at least one suggested tag associated with at least one event type can be received from a third party system. A deep search of documents or files can also be conducted to automatically determine the at least one automatically determined tag provided with the option.

In certain example embodiments, the at least one automatically determined tag can be determined based on users like a user of the client device having tagged similar events using a suggested tag.

In certain example embodiments, a formula editing functionality can be provided in the user interface in association with one or more event entries. A script editor can also be provided via the user interface to enable a script to be associated with a trigger point, the script defining one or more operations using event data.

FIG. 1 illustrates an exemplary computing environment 8. In one aspect, the computing environment 8 may include a tagging system 10, one or more client devices 12, and a communications network 14 connecting one or more components of the computing environment 8.

The computing environment 8 may also include a financial institution system 16 (e.g., for a commercial bank) that provides financial services accounts to users and processes financial transactions associated with those financial service accounts. While several details of the financial institution system 16 have been omitted for clarity of illustration, reference will be made to FIG. 3 below for additional details.

The financial institution system 16 includes or otherwise has access to a datastore for storing transaction data 18. The tagging system 10 includes or otherwise has access to an auto-tagging datastore 20 and a transaction document datastore 22. The datastores 20, 22 may include any information or content, such as metadata, tags, notes, files (e.g., PDFs), links (e.g., uniform resource locators (URLs)), images, videos, etc. that have been associated with one or more transaction entries. As such, the data stored in the data stores 20, 22 can be mapped to the transaction data 18. The transaction data 18 may include both data associated with a user of a client device 12 that interacts with the tagging system 10 and financial institution system 16 (e.g., for participating in mobile banking) and transaction history data that is captured and provided with a transaction entry, e.g., in the graphical user interface of a mobile or web-based banking application. The data associated with a user can include client profile data that may be mapped to corresponding financial data 68 (see FIG. 3) for that user and/or may include some of the financial data 68. It can be appreciated that the financial data 68 shown in FIG. 3 could also include the transaction data 18 shown in FIG. 1 and these datastores are shown separately for illustrative purposes. The client profile data can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client profile data may also include historical interactions and transactions associated with the tagging system 10 and/or financial institution system 16, e.g., login history, search history, communication logs, documents, etc.

It can be appreciated that the datastores 20, 22 are shown separated from the tagging system 10 for illustrative purposes only and may also be at least partially stored within a database, memory, or portion thereof within the tagging system 10. It can also be appreciated that while the tagging system 10 and financial institution system 16 are shown as separate entities in FIG. 1, they may also be part of the same system. For example, the tagging system 10 can be hosted and provided as part of the financial institution system 16.

Client devices 12 may be associated with one or more users. Users may be referred to herein as customers, clients, correspondents, or other entities that interact with the financial institution system 16 and/or tagging system 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based banking application which uses or incorporates the tagging system 10 to assist in augmenting transaction entries with additional content as herein described. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, tagging system 10 may be one or more computer systems configured to process and store information and execute software instructions to perform one or more processes consistent with the disclosed embodiments. In certain embodiments, although not required, tagging system 10 may be associated with one or more business entities. In certain embodiments, tagging system 10 may represent or be part of any type of business entity. For example, tagging system 10 may be a system associated with a commercial bank (e.g., financial institution system 16), a retailer, or some other type of business. The tagging system 10 can also operate as a standalone entity that is configured to serve multiple business entities, e.g., to act as an agent therefor.

Referring back to FIG. 1, the tagging system 10 and/or financial institution system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the tagging system 10 and financial institution system 16. The cryptographic server may be used to protect the financial data 68 and/or transaction data 18 and/or data stored in the datastores 20, 22 by way of encryption for data protection, digital signatures or message digests for data integrity, and by using digital certificates to authenticate the identity of the users and client devices 12 with which the financial institution system 16 and/or tagging system 10 communicates to inhibit data breaches by adversaries. It can be appreciated that various cryptographic mechanisms and protocols can be chosen and implemented to suit the constraints and requirements of the particular deployment of the tagging system 10 or financial institution system 16 as is known in the art.

Figure 2:
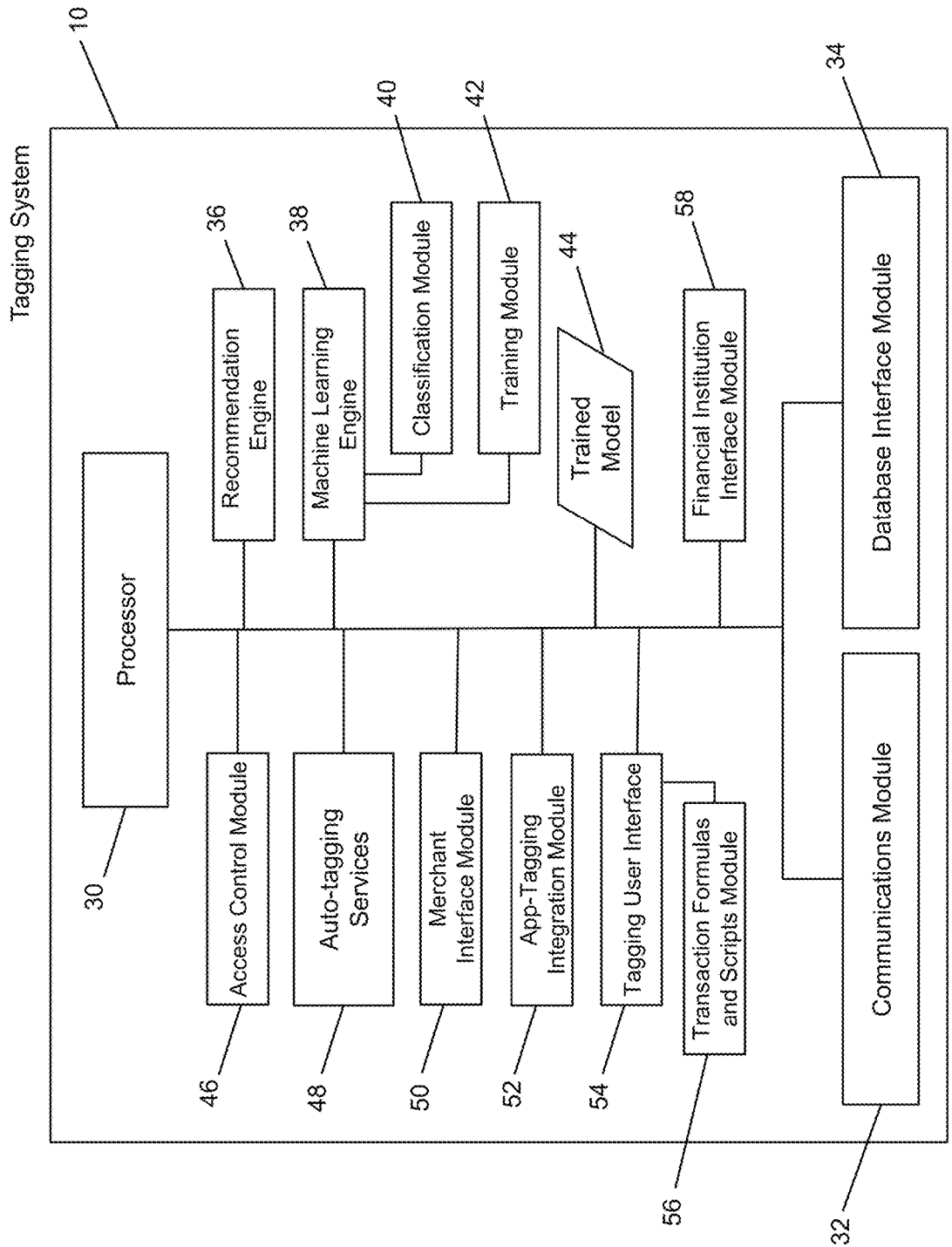
FIG. 2 is a block diagram of an example configuration of a tagging system.

In FIG. 2, an example configuration of the tagging system 10 is shown. In certain embodiments, the tagging system 10 may include one or more processors 30, a communications module 32, and a database interface module 34 for interfacing with the datastores 20, 22 (and if permitted transaction data 18—see dashed lines in FIG. 1) to retrieve, modify, and store (e.g., add) data. Communications module 32 enables the tagging system 10 to communicate with one or more other components of the computing environment 8, such as client device 12 (or one of its components), via a bus or other communication network, such as the communication network 14. While not delineated in FIG. 2, the tagging system 10 includes at least one memory or memory device that can include a tangible and non-transitory computer-readable medium having stored therein computer programs, sets of instructions, code, or data to be executed by processor 30. FIG. 2 illustrates examples of modules, tools and engines stored in memory on the tagging system 10 and operated by the processor 30. It can be appreciated that any of the modules, tools, and engines shown in FIG. 2 may also be hosted externally and be available to the tagging system 10, e.g., via the communications module 32. In the example embodiment shown in FIG. 2, the tagging system 10 includes a recommendation engine 36, a machine learning engine 38, a classification module 40, a training module 42, a trained model 44, an access control module 46, auto-tagging services 48, a merchant interface module 50, an app-tagging integration module 52, a tagging user interface 54, a transaction formulas and scripts module 56, and a financial institution interface module 58.

The recommendation engine 36 is used by the tagging system 10 to generate one or more recommendations for a client device 12 that is/are related to an association between transactions or users or that is/are related to a "suggested" tag for a transaction for the user to add in an area or portion of an application such as a financial institution mobile or web application. It may be noted that a recommendation as used herein may refer to a prediction, suggestion, inference, association or other recommended identifier that can be used as a tag, based on information that is provided to or inferred from the content that is gathered and/or provided to the tagging system 10 and stored as tagged data in one or more of the datastores 20, 22. The recommendation engine 36 can access the tagged data in the datastores 20, 22 and, if permitted, the transaction data 18 (or other financial data 68) via the databases interface module 34 and apply one or more inference processes to generate the recommendation(s). The recommendation engine 36 may utilize or otherwise interface with the machine learning engine 38 to both classify data currently being analyzed to generate a suggestion or recommendation, and to train classifiers using data that is continually being processed and accumulated by the tagging system 10. That is, the recommendation engine 36 can learn tagging preferences and revise and refine tagging classifications over time.

The machine learning engine 38 may also perform operations that classify the tagged data in accordance with corresponding classifications parameters, e.g., based on an application of one or more machine learning algorithms to each of the groups of data 18, 20, 22, 68 (also referred to herein as "user content", "tagged content", "user information" or "client information"). The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the tagged content or content to be tagged, the recommendation engine 36 may further process each element of the content to identify, and extract, a value characterizing the corresponding one of the classification parameters, e.g., based on an application of one or more additional machine learning algorithms to each of the elements of the profile or tagged content. By way of example, the additional machine learning algorithms may include, but are not limited to, an adaptive natural language processing algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 40, and training data may be stored and maintained using the training module 42.

The trained model 44 may also be created, stored, refined, updated, re-trained, and referenced by the tagging system 10 and/or financial institution system 16 to determine associations between users, transactions, or content. Such associations can be used to generate "people like you" recommendations or suggestions for tagging data. The trained model 44 can also be used to enhance searching functions, e.g., within other parts of the financial institution system 16 such as searching tools used to locate information within a user's account. That is, the trained model 44 can be used in both searching and other functions or applications utilized or provided by the financial institution system 16. In one example, the trained model 44 may correspond to a Word2Vec-type model, which may represent a group of related models that are used to produce word embeddings, e.g., shallow, two-layer neural networks that are trained to reconstruct linguistic contexts of words. It can be appreciated that the trained model 44 can also include or correspond to other types of associative models that enable associations to be made between users, transactions, and other data.

In some instances, classification data stored in the classification module 40 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the data 18, 20, 22, 68 and certain potential actions. For example, a transaction for a retailer could be associated with a "grocery" tag based on how other users tag that retailer. This can be useful for transactions that occur in an online marketplace or retailer that is not traditionally known as a "grocery store".

In some instances, the additional, or alternate, machine learning algorithms may include one or more adaptive, natural-language processing algorithms capable of parsing each of the classified portions of the profile content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of tagged content (e.g., a value or type of data being augmented with a transaction) and a single classification parameter and additionally, or alternatively, multiple classification parameters.

Based on the output of the one or more machine learning algorithms or processes, such as the one-dimensional, convolutional neural network model described herein, machine learning engine 38 may perform operations that classify each of the discrete elements of tagged content as a corresponding one of the classification parameters, e.g., as obtained from classification data stored by the classification module 40.

The outputs of the machine learning algorithms or processes may then be used by the recommendation engine 36 to generate one or more suggested tags that can be presented to the user, either dynamically or as a predefined or predetermined tag that is available if/when a user chooses to tag a particular transaction entry.

Referring again to FIG. 2, the access control module 46 may be used to apply a hierarchy of permission levels or otherwise apply predetermined criteria to determine what transaction data 18, tagged data stored in the datastores 20, 22 or financial data 68 can be shared with which entity in the computing environment 8. For example, the tagging system 10 may have been granted access to certain sensitive transaction data 18 or financial data 68 for a user, which is associated with a certain client device 12 in the computing environment 8. Similarly, certain client profile data stored in the transaction data 18, tagged data stored in the datastores 20, 22 or financial data 68 may include potentially sensitive information such as age, date of birth, or nationality, which may not necessarily be needed by the tagging system 10 to execute certain actions. As such, the access control module 46 can be used to control the sharing of certain client profile data or other transaction data 18 and/or tagged data in the datastores 20, 22 and/or financial data 68 based on a type of client/user, a permission or preference, or any other restriction imposed by the computing environment 8 or application in which the tagging system 10 is used.

The tagging system 10 may also include an auto-tagging service or, as exemplified in FIG. 2, a number of auto-tagging services 48 that are configured to perform auto-tagging operations as described in greater detail below in connection with FIG. 5. The tagging system 10 may also include a merchant interface module 50 to enable external merchants to interface with the tagging system 10, e.g., to provide merchant-specific tags and/or to use information determined from auto-tagging operations to generate user-specific rewards or promotions to push to the client device 12.

The tagging system 10 may also include an app-tagging integration module 52 that is provided to enable entities in the computing environment 8 to communicate with the tagging system 10, e.g., via an existing banking application or other application used by the client for interfacing with the financial institution system 16. The app-tagging integration module 52 can take the form of an application programming interface (API), software development kit (SDK) or any other software, plug-in, agent, or tool that allows the tagging system 10 to be integrated with or within an application associated with another entity. For example, the app-tagging integration module 52 can enable tagging functionality to be integrated into a financial institution application 90 (see FIG. 4) to enable users of the client devices 12 to augment their transaction histories with the financial institution system 16.

The tagging system 10 may also include a tagging user interface 54 that provides way for a user to obtain content from their client device 12 and provide such content to the tagging system 10 to be stored in one or both of the datastores 20, 22. It can be appreciated that the app-tagging integration module 52 and tagging user interface 54 are shown separately in FIG. 2 for illustrative purposes and the functionality thereof could instead be integrated.

In this example embodiment, the tagging user interface 54 and auto-tagging services 48 are integrated within the tagging system 10 to leverage the recommendation engine 36 and machine learning engine 38 to intelligently determine associations, generate suggested or recommended tags to be used by clients when interacting with an application provided by the financial institution system 16, and learn tagging preferences based on user interactions with the tagging system 10. The application can be a web-based application accessible through the client device 12 or an "app" residing on the client device 12, or any other platform or portal that effectively provides the same functionality, collectively referred to herein as an "application" having a list, log, or other series of entries such as a transaction history as exemplified herein.

The tagging user interface 54 may also include or have access to a transaction formulas and scripts module 56. The transaction formula and scripts module 56 is configured to integrate a formula editor and scripts engine (see FIGS. 7 and 8) into the tagging system 10, to provide users with additional functionality with which to manipulate and consume their transaction history data and financial data 68 more generally.

Figure 3:
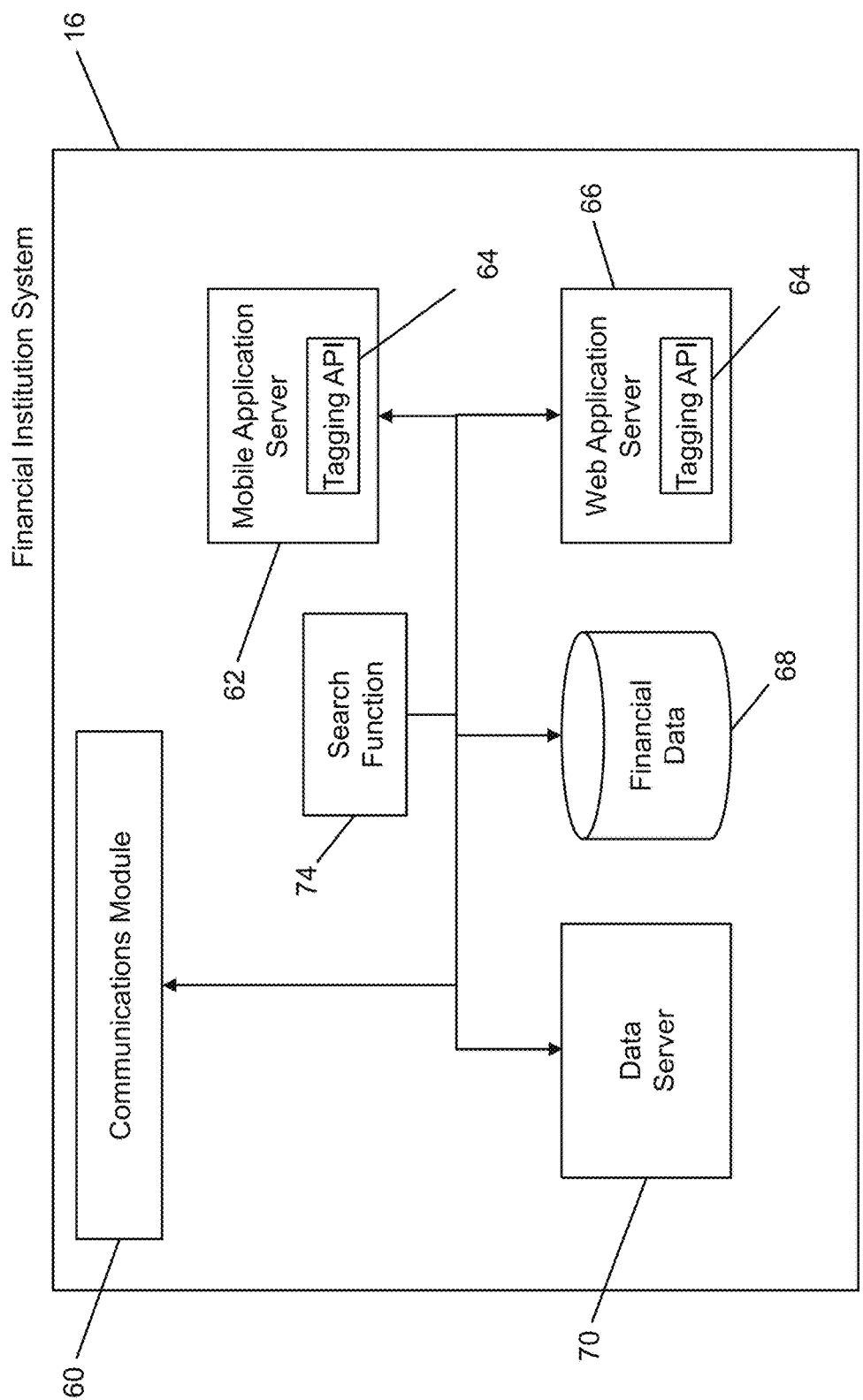
FIG. 3 is a block diagram of an example configuration of a financial institution system.

The tagging system 10 may also include a financial institution interface module 58 to provide a graphical user interface (GUI) or API connectivity to communicate with the financial institution system 16 to obtain transaction data 18 and financial data 68 for a certain user (see FIG. 3). It can be appreciated that the financial institution interface module 58 may also provide a web browser-based interface, an application or "app" interface, a machine language interface, etc.

In FIG. 3, an example configuration of the financial institution system 16 is shown. The financial institution system 16 includes a communications module 60 that enables the financial institution system 16 to communicate with one or more other components of the computing environment 8, such as client device 12 (or one of its components) or tagging system 10, via a bus or other communication network, such as the communication network 14. While not delineated in FIG. 3, the system 16 includes at least one memory or memory device that can include a tangible and non-transitory computer-readable medium having stored therein computer programs, sets of instructions, code, or data to be executed by one or more processors (not shown for clarity of illustration). FIG. 3 illustrates examples of servers and datastores/databases operable within the system 16. It can be appreciated that any of the components shown in FIG. 3 may also be hosted externally and be available to the system 16, e.g., via the communications module 60. In the example embodiment shown in FIG. 3, the financial institution system 16 includes one or more servers to provide access to the transaction data 18 (which may be included in the financial data 68 or stored separately as shown in FIG. 1) to the tagging system 10 to enable the tagging system 10 to enable tags to be created and for tags to be learned, suggested and/or recommended to the user. Exemplary servers include a mobile application server 62, a web server 66 and a data server 70. Although not shown in FIG. 0.3, as noted above, the system 16 may also include a cryptographic server for performing cryptographic operations and providing cryptographic services. The cryptographic server can also be configured to communicate and operate with a cryptographic infrastructure. The system 16 may also include one or more data storages for storing and providing data for use in such services, such as data storage for storing financial data 68.

Mobile application server 62 supports interactions with a mobile application installed on client device 12. Mobile application server 62 can access other resources of the financial institution system 16 to carry out requests made by, and to provide content and data to, a mobile application on client device 12. In certain example embodiments, mobile application server 62 supports a mobile banking application to provide payments from one or more accounts of user, among other things. As shown in FIG. 3, the mobile application server 62 can include a tagging API 64 which enables the mobile application to integrate or otherwise coordinate or work with the tagging system 10 to provide a tagging functionality. For example, the tagging API 64 can communicate with the tagging system 10 via the app-tagging integration module 52 in the tagging system 10 (see FIG. 2). This allows, for example, a user to add content and tag such content to transactions or other events or actions.

Web application server 66 supports interactions using a website accessed by a web browser application 92 (see FIG. 4) running on the client device 12. It can be appreciated that the mobile application server 62 and the web application server 66 can provide different front ends for the same application, that is, the mobile (app) and web (browser) versions of the same application. For example, the financial institution system 16 may provide a banking application that be accessed via a smartphone or tablet app while also being accessible via a browser on any browser-enabled device. As shown in FIG. 3, the web application server 66 may also include a tagging API 64 to enable the web application to integrate or otherwise coordinate or work with the tagging system 10 to provide tagging functionality.

The financial data 68 may be associated with users of the client devices 12 (e.g., customers of the financial institution). The financial data 18 may include any data related to or derived from financial values or metrics associated with customers of the financial institution system 16, for example, account balances, transaction histories, line of credit available, credit scores, mortgage balances, affordability metrics, investment account balances, investment values and types, among many others. Other metrics can be associated with the financial data 68, such as financial health data that is indicative of the financial health of the users of the client devices 12. As indicated above, it can be appreciated that the transaction data 18 shown in FIG. 1 may be part of the financial data 68 held by the financial institution system 16 and is shown separately for ease of illustration and ease of reference herein.

The search function 74 is an example of a module, function, service, tool or option provided with in the financial institution system 16 that may be used by one or more of the servers 62, 66, 70 to enable users and/or administrators to perform searching functions. For example, the search function 74 can be utilized by a mobile or web-based banking application to allow a user to search through their transactions to locate and/or organize data. The search function 74 can also be used by internal administrative tools, e.g., for financial auditing and reporting, for searching client data. The search function 74 can benefit from the results of analyses performed by the tagging system 10 and/or other features within or used by the financial institution system 16. For example, the search function 74 can have access to the tagged data in the datastores 20, 22 to assist in locating appropriate content from the transaction data 18 or financial data 68 when conducting keyword searches.

Figure 4:
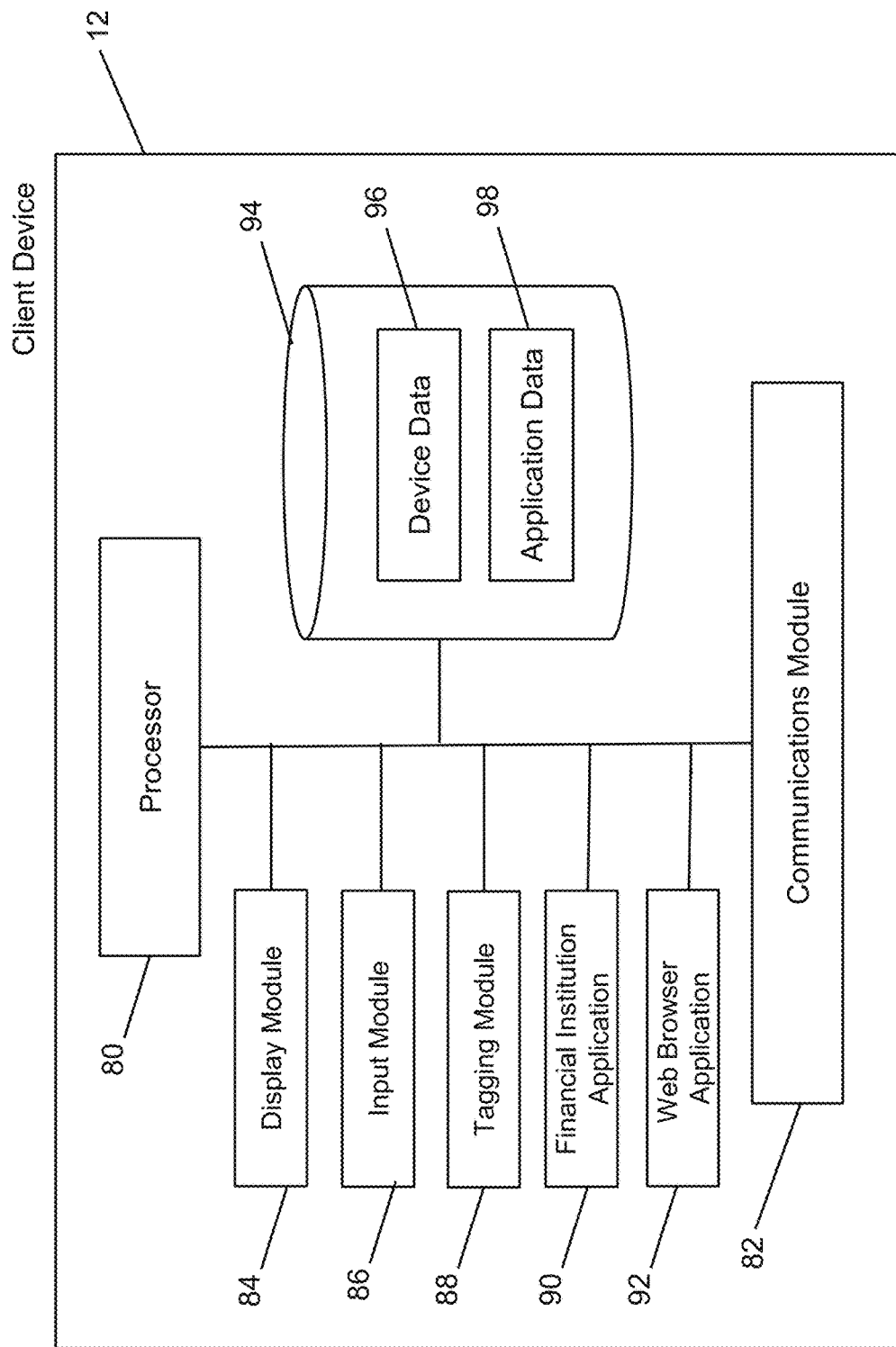
FIG. 4 is a block diagram of an example configuration of a client computing device associated with a user, customer, or client.

In FIG. 4, an example configuration of the client device 12 is shown. In certain embodiments, the client device 12 may include one or more processors 80, a communications module 82, and a data store 94 storing device data 96 and application data 98. Communications module 82 enables the client device 12 to communicate with one or more other components of the computing environment 8, such as tagging system 10 or financial institution system 16, via a bus or other communication network, such as the communication network 14. While not delineated in FIG. 4, the client device 12 includes at least one memory or memory device that can include a tangible and non-transitory computer-readable medium having stored therein computer programs, sets of instructions, code, or data to be executed by processor 80. FIG. 4 illustrates examples of modules and applications stored in memory on the client device 12 and operated by the processor 80. It can be appreciated that any of the modules and applications shown in FIG. 4 may also be hosted externally and be available to the client device 12, e.g., via the communications module 82.

In the example embodiment shown in FIG. 4, the client device 12 includes a display module 84 for rendering GUIs and other visual outputs on a display device such as a display screen, and an input module 86 for processing user or other inputs received at the client device 12, e.g., via a touchscreen, input button, transceiver, microphone, keyboard, etc. The client device 12 may also include a tagging module 88, which may take the form of a customized app, plug-in, widget, or software component provided by the tagging system 10 for use by the client device 12 to tag content and thus contribute to the datastores 20, 22 handled by the tagging system 10. As indicated above, such a tagging functionality can be a stand-alone application or be a page, tab or portion of another application such as a mobile banking application. The tagging module 88 may also be navigable to/from such an application. Similarly, the client device 12 may include a financial institution application 90 provided by their financial institution system 16, e.g., for performing mobile banking operations. The client device 12 in this example embodiment also includes a web browser application 92 for accessing Internet-based content, e.g., via a mobile or traditional website. The data store 94 may be used to store device data 96, such as, but not limited to, an IP address or a MAC address that uniquely identifies client device 12 within environment 8. The data store 94 may also be used to store application data 98, such as, but not limited to, login credentials, user preferences, cryptographic data (e.g., cryptographic keys), etc.

It will be appreciated that only certain modules, applications, tools and engines are shown in FIGS. 2 to 4 for ease of illustration and various other components would be provided and utilized by the tagging system 10, financial institution system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in tagging system 10 or financial institution system 16, or client device 12, or accessible or connectable thereto. Any application or module herein described may be implemented using computer readable/executable instructions that may be stored or otherwise held by such computer readable media.

Figure 5:
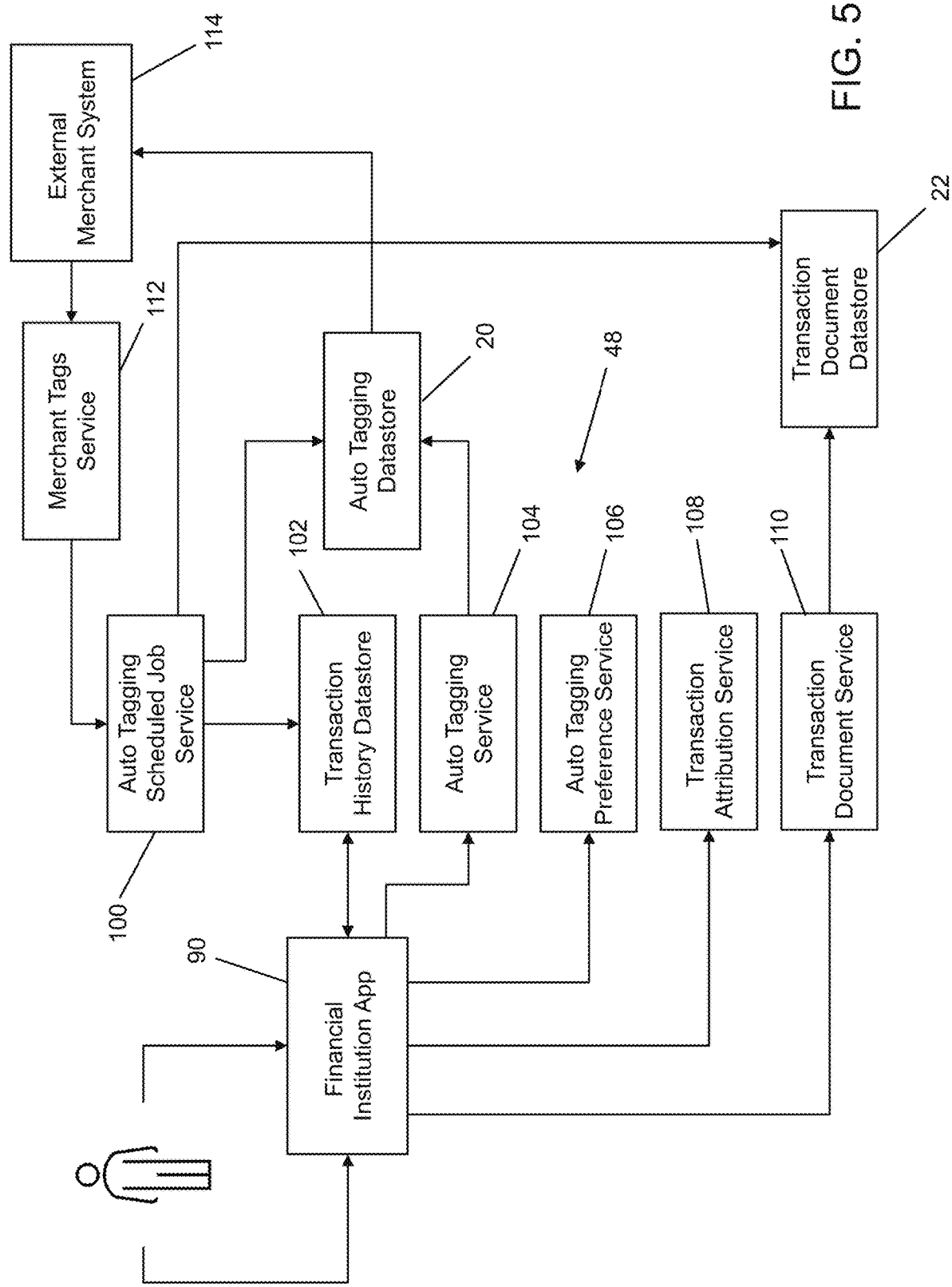
FIG. 5 is a flow diagram of an example configuration for the auto-tagging services.

FIG. 5 illustrates an example configuration for the auto-tagging services 48, shown in FIG. 2. The auto-tagging services 48 in this example include a number of services that can be coordinated to tag transactions and data/documents associated with transactions and generate and recommend tags to the client devices 12. In this example, a user interfaces with the financial institution app 90 or a webpage version thereof. For example, users can use the financial institution app 90 to view a transaction history. The auto-tagging services 48 can include or have access to a transaction history data store 102, which returns a list of transactions. An auto tagging service 104 can be used to retrieve suggested transaction tags per item in the transaction history. It can be appreciated that there can be one or more tags per transaction and those tags may have been suggested by, for example, the customer, an external merchant system 114, or by "people like you" that have tagged this transaction that way.

An auto tagger preference service 106 can be implemented to respect the customer preferences and can decide to display certain tags based upon how the customer has setup those tags and whether to display external tags, personal tags, or "people like you" tags. For example, the financial institution app 90, using the tagging module 88 can enable the user to set preferences, defaults and/or personalize how tags are selected and applied. This may also involve generating recommendations and suggestions using the trained model 44 via the app-tagging integration module 52 of the tagging system 10. A transaction attribution service 108 can also be used to attribute tags to transactions.

The auto tagging datastore 20 can be used in this example configuration to store tags and their relationships. The auto tagging datastore 20 can also store metadata about the relationship back to the transaction, user, and user account. The auto tagging service 104 can be used to call the auto tagging data store 20 to store the relationships that customers establish. The auto tagging service 104 can also be called by the auto tagger scheduled job service 100, which runs on a periodic basis and real-time basis listening for real-time transactions to tag and apply customer and system rules against a given transaction, account, and customer.

The auto tagging datastore 20 can also send anonymized tags to the external merchant systems 114. The external merchant systems 114 can receive the anonymous tags from users (i.e. customers or potential customers) and enrich the data with coupons/rewards/offers/advertisements and/or one-time promotions. That is, the external merchant systems 114 can be integrated with the auto-tagging services 48 to leverage the auto-tagging operations to determine appropriate follow-up actions such as promotions, coupons, rewards, etc. The external merchant systems 114 can also be given the option to suggest tags to users to help users with organizing their transaction history.

A merchant tags service 112 can be provided to send tags to the auto tagger scheduled job service 100, to determine which group of related customers is interested in receiving tags, promotions, offers, etc., from the external merchant system(s) 114. This can happen in real-time or using a batch process from the external merchant system(s) 114.

The auto tagging scheduled job service 100 can also include a real-time and batch-based component configured to have multiple responsibilities. One responsibility in this example is to suggest tags attributed to other users from their corresponding transaction histories. The auto tagging scheduled job service 100 can also be responsible for executing deep searches through documents using optical character recognition (OCR) and/or other deep document search techniques to determine which tags and documents associated with that particular customer can be applied to the specific transaction. For example, if a customer has uploaded a receipt and one or more specification manuals for a washer and dryer they purchased, the auto tagging services 48 can associate those documents and determine associated tags based upon a deep search. The auto tagger scheduled job service 100 can also store or have access to a corpus of common terms associated with a merchant and can associate tags automatically. The auto tagging scheduled job service 100 can also extract any tags associated with historical tags for that merchant and attempt to associate the extracted tags with the given transaction and any documents associated with the transaction.

The auto tagging scheduled job service 100 can also store associated tags against the auto tagging datastore 20, thus associating transactions, customers, and accounts with the tagging scheme described above. Documents may also be retrieved, extracted using OCR, PDF extraction, Microsoft Word® or other document extraction methods; and analyzed for tags, dates, times, uniform resource indicators (URIs), and previously associated tags. The documents can be stored in the transaction document datastore 22. As shown in FIG. 5, the financial institution app 90 can also interact with a transaction document service 100 to enable users to upload or create documents for the transaction document datastore 22.

It can be appreciated that users can also have the ability to search their tags and include a hierarchy into the tags, e.g., via the financial institution app 90. The tags can be presented as a directed graph chart or other GUI view. The users can tap/click on the graph and have that descend further into the graph. Users can also search/sort/filter by tags using a fuzzy search mechanism or a semantic search mechanism. For example, "coffee" and "Starbucks®" may be synonymous, and if a tag is not already associated with Starbucks® coffee, the semantic relationship would pre-exist for merchants when matches are found. While a specific arrangement of auto-tagging services 48 is shown in FIG. 5, it can be appreciated that other configurations and interrelationships can be employed within the principles discussed herein.

Figure 6:
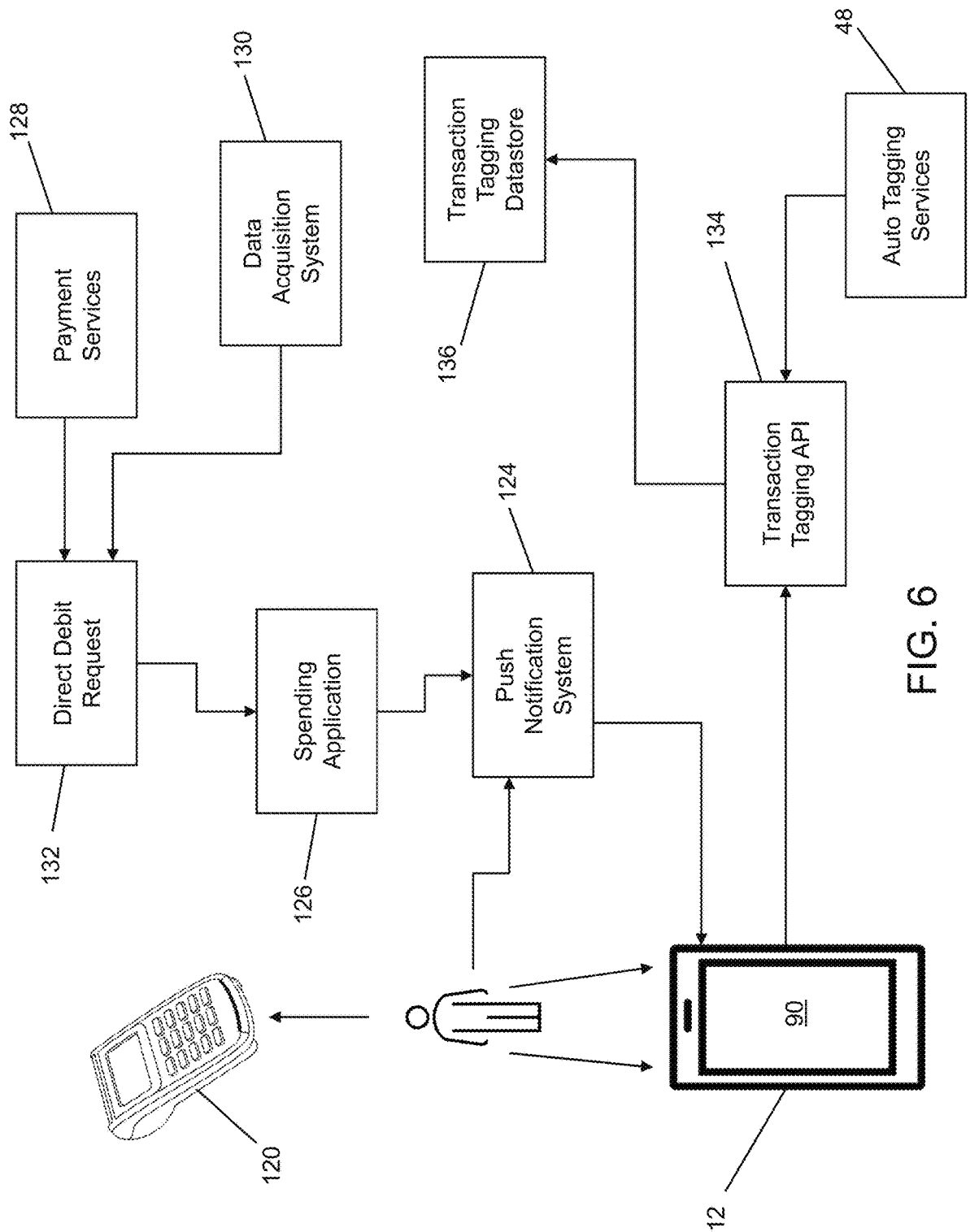
FIG. 6 is a flow diagram of an example configuration for executing the auto-tagging services using a push notification system in response to a point-of-sale transaction.

FIG. 6 illustrates an example configuration for executing the auto-tagging services 48 using a push notification system 124 in response to a point-of-sale transaction at a point of sale terminal 120. In this example, a user executes a purchase at the point of sale terminal 120 and a payment or merchant services 128 (e.g., TYSYS) and/or data acquisition system 130 provides real-time credit card transaction data or real-time transactions from chequing/savings accounts depending on the method of payment used via a direct debit request 132. These real-time transactions are pushed to a spending application 126 (e.g. budgeting or financial management app) and the spending application 126 notifies the user at a client device 12 (e.g., smartphone) using the push notification system 124.

The client device 12 can be used to display the notification, e.g., via the financial institution app 90, allowing the customer to tap/click on the push notification. The user may then choose to tag the transaction from or through the notification. In this configuration, the transaction is associated with one or more tags through a transaction tagging API 134 based on the user's interaction with the push notification via their client device 12. The association can be stored in a transaction tagging datastore 136 by the transaction tagging API 134. The transaction tagging API 134 can also automatically learn tags and apply tagging system setup selections made by the customer, in this example from an auto tagging process implemented by the auto tagging services 48.

It can be appreciated that the customer can search for transactions on a tag-by-tag basis, through the spending application 126 and/or financial institution app 90 (e.g., mobile banking app). The tagging done by the user can also be done through the spending application 126 or through the financial institution app 90. For any connected/integrated device or application, the user can then search based on the tags, and can receive additional notifications based on the tagged data. For example, the user (with requisite permissions accepted) can receive targeted rewards based on the timing of certain transactions. The transactions and tags can therefore be used to determine when periodic transactions occur to send the targeted reward at the appropriate time (e.g., 30 minutes before the customer typically buys their morning coffee).

Figure 7:
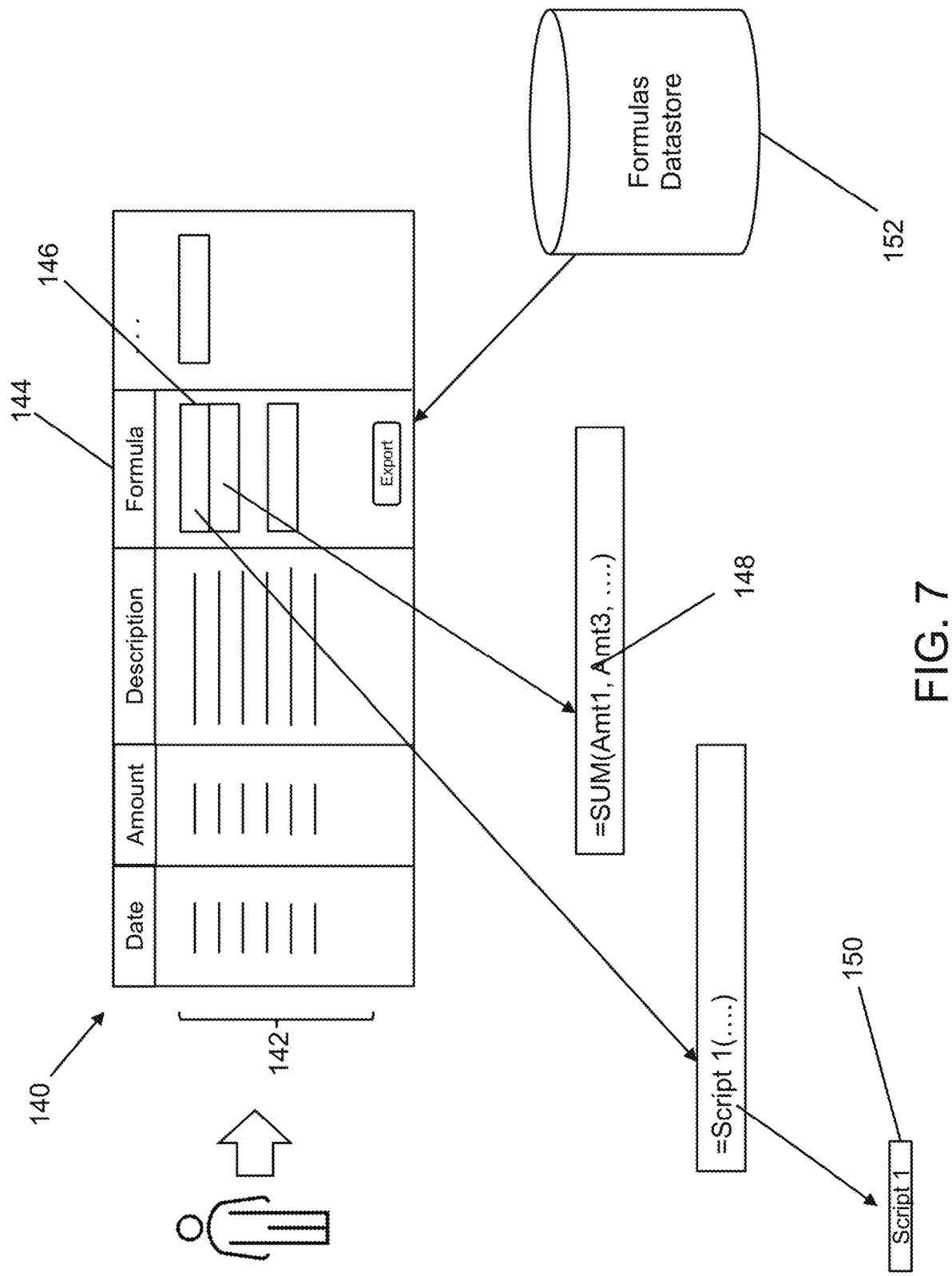
FIG. 7 is a schematic diagram of a formula-based tag entry configuration.

FIG. 7 is a schematic diagram of a formula-based tag entry configuration that can be implemented using the transaction formulas and scripts module 56. This functionality includes embedding a formula editing and programming functionality 146 directly into an application screen such as a transaction history screen 140. In the example shown in FIG. 7, the formula editing functionality 146 can be provided within a separate formulas column 144 built into the transaction history screen 140. The formula editing functionality 146 can resemble or directly embed a spreadsheet-like module such as Microsoft Excel®, to provide a familiar syntax and user experience. In this way, users can add their own formulas to transaction data, either at the transaction level or at a group of transactions level. The functionality can be supported by a back-end infrastructure that enables data to be pulled into the formula, scripts or other actions to be called from the formula, and formulas to be purchased or otherwise acquired from a formulas datastore 152.

Referring to the illustrative example in FIG. 7, a user can log into an online website or access an app, such as the financial institution app 90 used for banking, or other apps used for wealth management, credit cards, etc. Transaction screen 140 is shown in this example with typical transaction information such as dates, amounts, and descriptions. The formula editing functionality 146 is embedded alongside transactions in the formulas column 144 to enable transaction level or group level formula creation, editing, insertion, etc. The formula 148 (shown by way of example in enlargement) can be named, vetted, and pushed to other screens used by the user. An example of a formula is shown, which applies a "SUM" operation to a number of amounts, i.e., a group of related transactions, for example amounts associated with groceries. Another example shown in an enlargement in FIG. 7 includes a formula that calls a script 150 to execute one or more preprogrammed operations. For example, the script 150 can notify other applications when spending thresholds are met for certain categories of items, or total amount spent during a predetermined period of time, etc. That is, the formula editing functionality 146 provides a mechanism for the use and triggering of a script 150 to be customized by the user, further details of which are provided in relation to FIG. 8 described below.

The formulas datastore 152 can be used to allow the user to export or save their formula or to purchase or "rent" formulas for a period of time. For example, tax-related formulas 148 can be rented during tax season to assist in tallying up interest payments or charitable contributions.

It can be appreciated that the user can define when and how the formula 148 is applied to their transactions and can be given the ability to retrieve other data and apply that to a group of transactions (or individually)—e.g., a FOREX rate. Users can also apply their own "group by" and "sorting" functions. The screens can also be given flexibility to allow customers to turn on/off the use of formulas 148 and allow the customers to remove, add, or update the formulas 148 at any time. The formulas 148 can be used statically (e.g., through data manipulation by the customer) or automatically—e.g., to examine transaction fields as they are added and add tags or add to a SUM of transactions. The formula column 144 therefore embeds a rich editing experience directly into a transaction screen 140 to give a user further control over their data and allow for data manipulation prior to exporting the data, e.g., to Microsoft Excel®.

Figure 8:
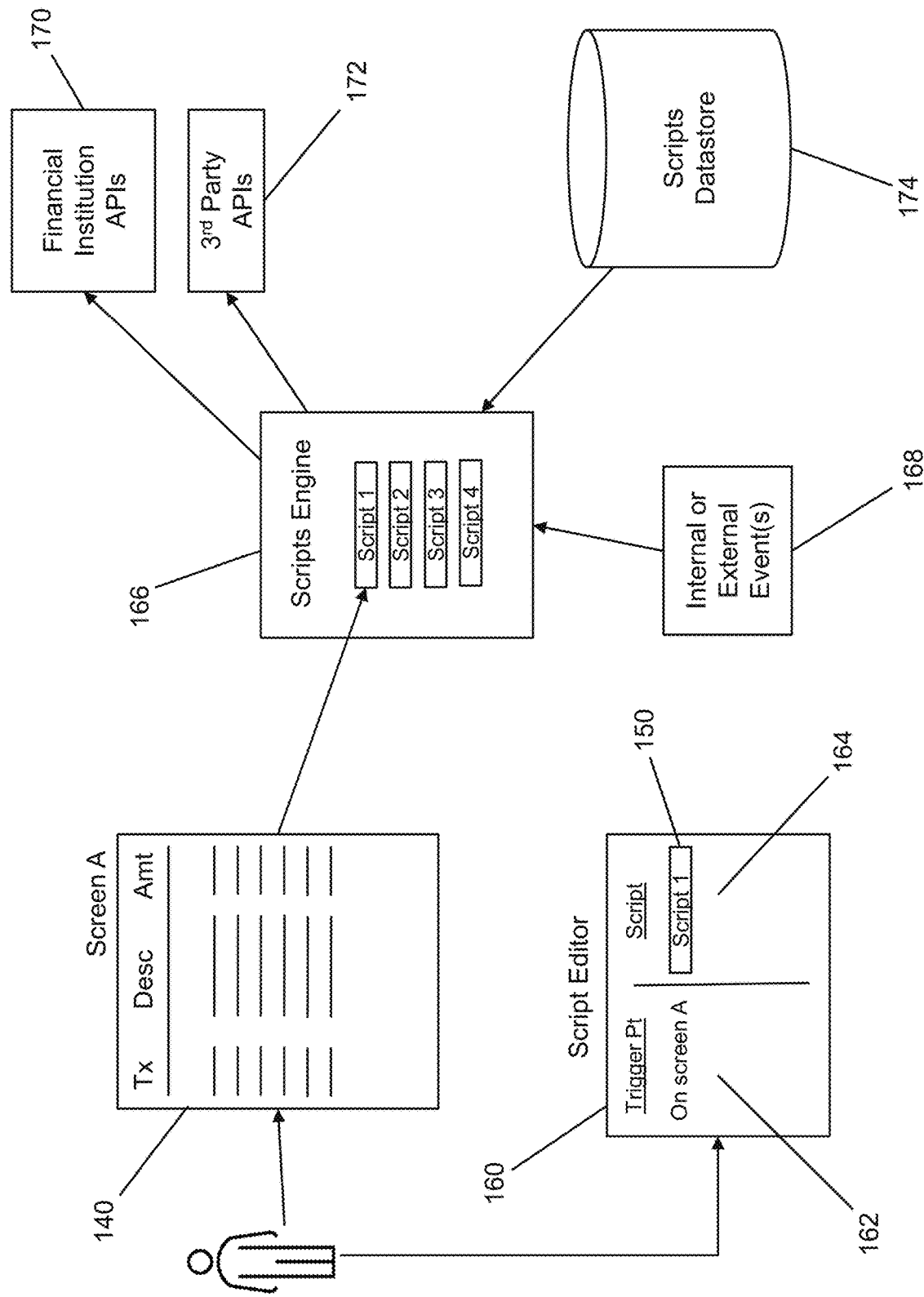
FIG. 8 is a block diagram of an example configuration for a script editor and script engine.

FIG. 8 is a block diagram of an example configuration for a script editor 160 and a scripts engine 166 that can be used to integrate scripts 150 into the transaction history data and with the formula functionality. The scripts configuration shown in FIG. 8 involves providing an infrastructure to allow users to select, create, integrate and apply scripts 150 to transaction data, e.g. data consumed via a transaction history screen 140. This transaction scripting provides users and/or third parties and/or internal administrators with the ability to utilize trigger-based scripts that are applied either on the client device 12 or on a server, based upon a given transaction event occurring on an account. This can be applied to any type of account that lists transactions, for example: chequing, savings, credit cards, loans, mortgages, wealth accounts, etc.

The infrastructure shown in FIG. 8 enables users to select from a set of scripts 150 to be executed based on a trigger, which can occur before or after events associated with a transaction or based on the absence of a transaction (i.e. a synthetic trigger). For example, a customer can login to an online banking or wealth management platform and be able to select a script 150 from a scripts datastore 174 or other provider that has supplied and vetted the scripts 150. Such scripts 150 can apply tags, notes, images etc., automatically. The scripts datastore 174 can also provide an option for customers to buy/rent one of these scripts 150 similar to the formulas datastore 152. The script editor 160 can also allow users to select/assign scripts 150 for different trigger points and can provide the user with an ability to create a script 150 or edit/customize a script 150. In this way, the user can be provided with additional control over the experience associated with viewing and consuming transaction data.

Referring to the flow illustrated in FIG. 8, a user logs into the financial institution system 16 and can access the script editor 160 to assign scripts 150 to trigger points 162 or to create their own scripts 150. The user can also view transaction data in the transaction history screen (identified as Screen A in FIG. 8). Here, accessing Screen A causes Script 1 to be executed and, in this example, by accessing a cloud-based scripts engine 166. The scripts engine 166 can store and execute scripts 150 either based on user interactions like that depicted in FIG. 8, or based on other events, e.g., internal or external events 168. The scripts engine 166 can be populated from the scripts datastore 174 and can interact with internal or external APIs, in this example with financial institution APIs 170 provided by the financial institution system 16 and/or third party APIs 172. By exposing the scripts engine 166 to such APIs 170, 172, the scripts 150 can be used for various applications such as in fraud detection, personal or business accounting, finance budgeting, tax preparation, auto-tagging, etc.

The script editor 160 can provide varying levels of control. For instance, the script editor 160 can provide script building blocks, include a validation service to allow users to vet their creations and/or restrict what the user can do based on policies dictated by an organization such as the financial institution system 16. The script editor 160 can also allow users to submit scripts 150 to the scripts datastore 174 for monetization or crowd sharing. The scripts engine 166 can also provide a backend that coordinates the maintenance and execution of scripts 150. The scripts engine 166 interfaces with various components of the infrastructure to allow an organization to build on functionality or applications to the execution of scripts 150. The scripts datastore 174 can apply various models, such as tiering the scripts (free, pay, premium) or can manage a usage based model such that users only pay as they use the scripts 150.

Figure 9:
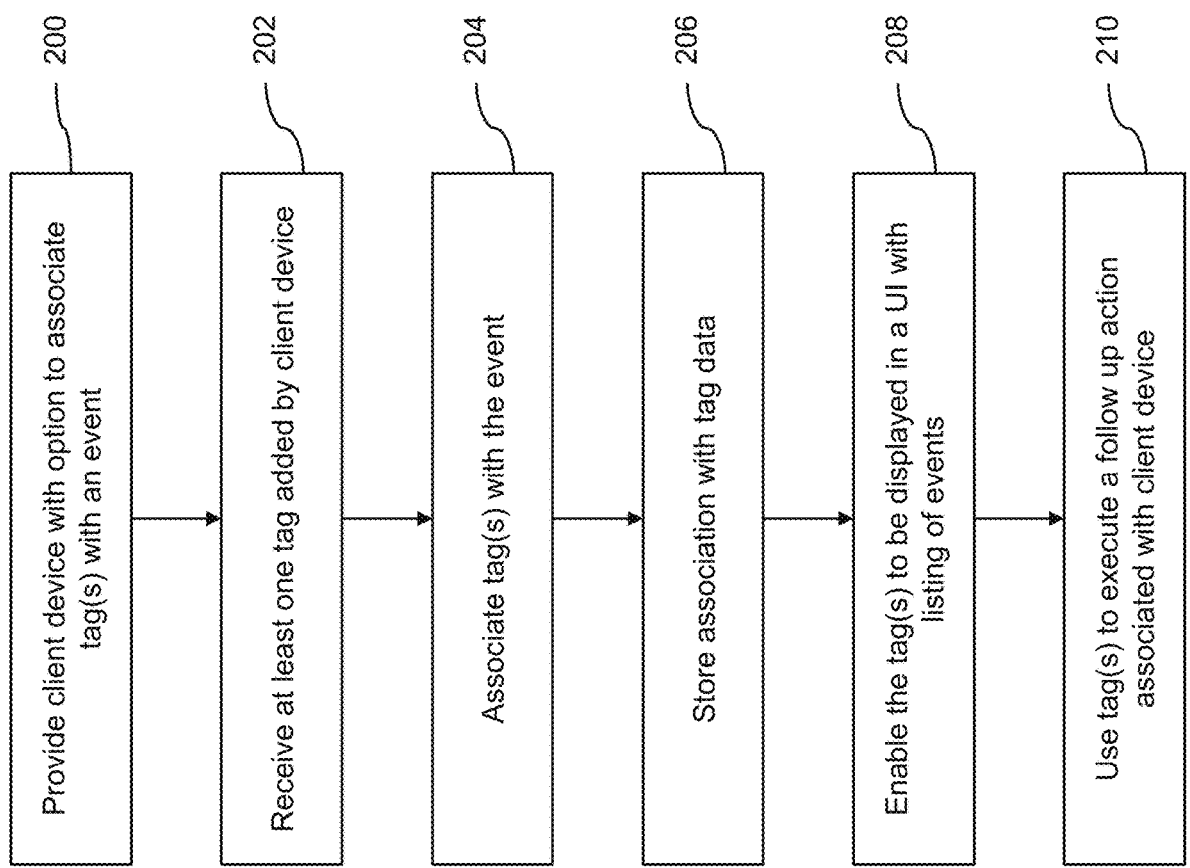
FIG. 9 is a flow diagram of an example of computer executable instructions for tagging data.

Referring now to FIG. 9, an example embodiment of computer executable instructions for tagging data is shown. At block 200, the financial institution system 16, or the tagging system 10 on behalf of the financial institution system 16, provides an option to associate tags with events, such as transaction entries in a transaction history. The option provides at least one automatically determined tag determined by the auto-tagging services 48 based on: i) the event, ii) an entity associated with the client device 12, or iii) stored tag data associated with a number of client devices 12. This may be done through a graphical user interface of the financial institution application 90. At block 202 the tagging system 10 receives at least one tag that has been added by the user via input(s) to the client device 12. The auto tagging services 48 can be used at block 204 to associate the tag(s) with the event (e.g. transaction) and this association can be stored with the tag data at block 206, e.g., in the auto-tagging datastore 20 and/or transaction document datastore 22. The auto-tagging services 48 then enable the tag(s) to be displayed at block 208 in a user interface that lists events, e.g., the transaction history screen 140. In this way, the tags can augment the events to provide additional meaning and customization to the user's experience. At block 210, the tag(s) are then used to execute a follow up action associated with the client device 12. This can include a push notification, a reward or coupon, a follow up reminder or an ability to group transactions, establish hierarchies, enable further tag customizations/additions, etc.

Turning now to FIG. 10, an example of a GUI for the financial institution application 90 is shown. In FIG. 10, a My Accounts page 220 is being displayed. The My Accounts page 220 lists the accounts that the user has with the financial institution system 16, in this case, a chequing account, a savings account, a line of credit account, and a credit card account. By selecting an account entry 222, in this case the entry 222 for the credit card, an account summary page 224 may be displayed as shown in FIG. 11. The account summary page 224 includes a number of options 226 for completing actions in association with the credit card, and portion that provides multiple tabs. In FIG. 11 an activity tab 228 is being displayed, which lists a number of transactions, each with a transaction entry 230.

Figure 12:
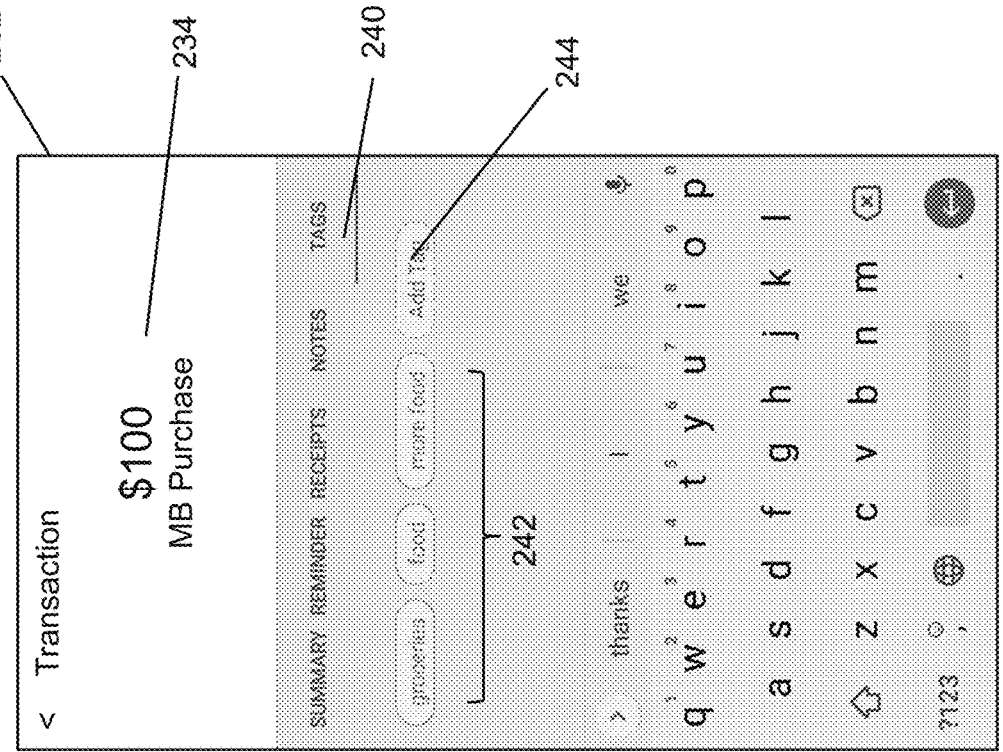
FIG. 12 is an example of a graphical user interface for a transaction details page of a financial institution application.

By selecting a transaction entry 230, in this case for "MP Purchase" of $100, a transaction details page 232 may be displayed as shown in FIG. 12. In the example shown in FIG. 12, the transaction details page 232 includes an identifier 234 (with amount), and some basic information 236 associated with the transaction, such as the date the transaction occurred, the date on which the transaction was posted to the financial institution system 16, and the account/card number. The transaction details page 232 may also include a number of tabs associated with the transaction. In this example, the summary tab 238 is being displayed. Other tabs may include a reminder tab to associate the transaction with a calendar, a receipts tab for associating a transaction receipt with the transaction, a notes tab, and a tags tab 240 (see FIG. 13 discussed below).

Figure 13:
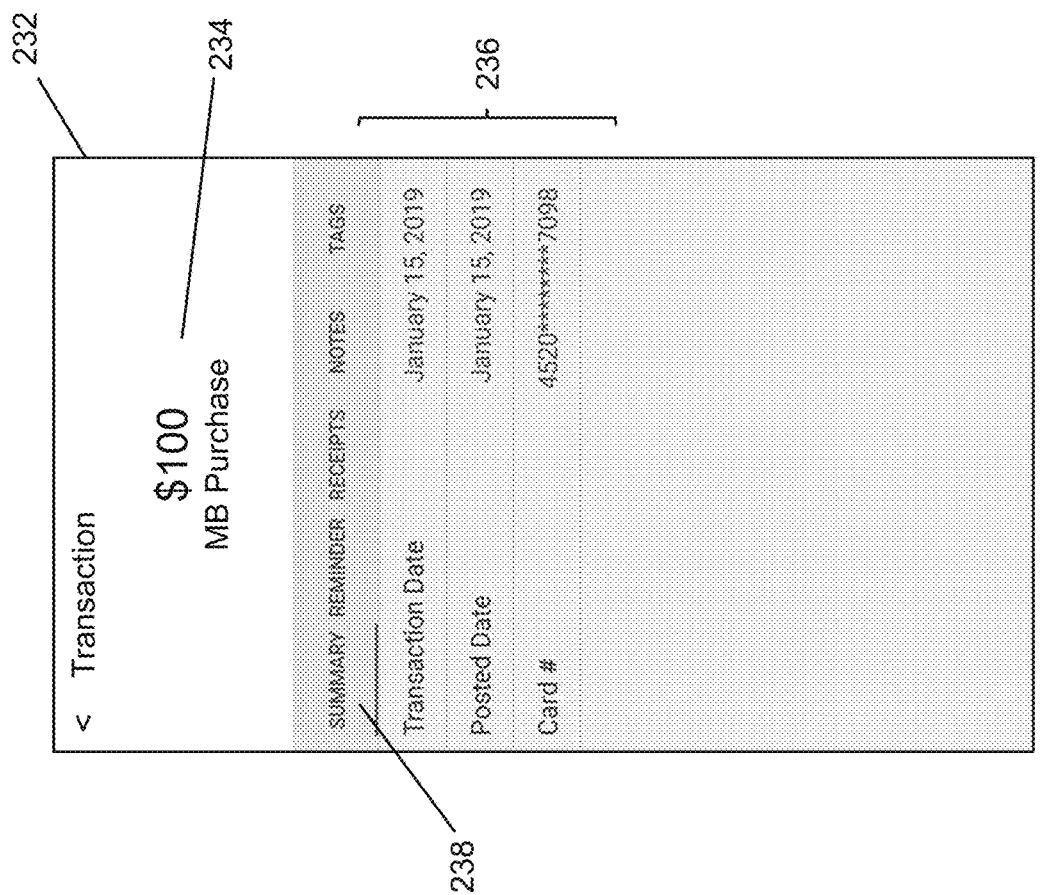
FIG. 13 is an example of a graphical user interface for a transaction details page of a financial institution application showing a tags tab with an option to create a tag.

FIG. 13 is an example of the transaction details page 232 with the tags tab 240 having been selected. In this example, a number of predetermined tags 242 are displayed for the user. It can be appreciated that the user can be prompted to accept the predetermined tags 242 and can be given the option to remove the tags if they are not appropriate for that particular transaction. Such predetermined tags 242 can include or otherwise be considered suggested or recommended tags prepared by the tagging system 10 based on the trained model 44 and data input to that model 44 and/or generated or determined by the auto-tagging services 48. The predetermined tags 242 can also include default tags that are not necessarily chosen using the model 44 or an analysis of the tagged data stored in the auto-tagging datastore 20.

FIG. 13 also illustrates an Add Tag option 244, which when selected allows the user to define their own tag. For example, a user can create the custom tag "Produce" to supplement the predetermined tags 242 "Groceries", "Food", and "More food". The custom tag can provide additional insight and context with respect to a purchase and when captured by the tagging system 10 can be used to further improve the associative trained model 44 for subsequently generating suggested tags for that user or users of other client devices 12.

As shown in FIG. 14, the account summary page 224 that displays the transaction entries 230 can also be updated with tag notifications 250 to alert the user of the existence of such suggested or recommended tags. It can be appreciated that the tag notification 250 may also be used to entice the user to enter the transaction details page 232 to enter content, select or create tags, etc. That is, the notifications 250 may be used to encourage collection of additional content for the tagging system 10, which can lead to more data and a more accurate trained model 44.

FIG. 15 illustrates a notifications view 260 showing a number of notifications 262 for a user to scroll through and select to navigate to an associated application. In this example, the notifications view 260 includes push notifications, alerts, reminders, alarms and incoming messages such as text messages, emails, or social media messages. Shown in FIG. 15 is a transaction notification 264 with tagging option 266. The transaction notification 264 can be a modified version of an existing transaction push notification that is displayed to the user when a transaction occurs with respect to a certain financial account (e.g., credit card purchase). The tagging option 266 can be a separate option (like the hyperlink illustrated in FIG. 15) or can be triggered automatically if/when the transaction notification 264 is selected. The transaction notification 264 shown visually in FIG. 15 can correspond to an output from the push notification system 124 shown in FIG. 6.

Figure 16:
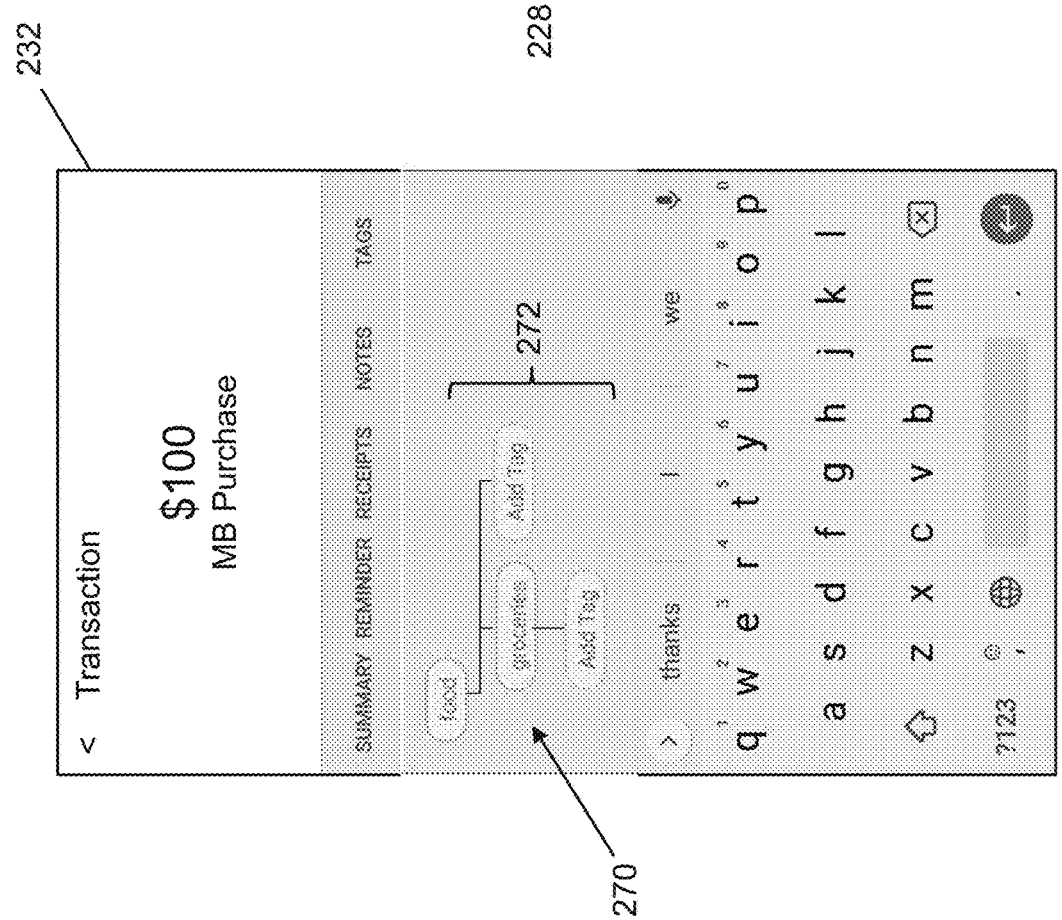
FIG. 16 is an example of a graphical user interface for a transaction details page of a financial institution application showing a tags tab with an option to create a hierarchy of tags.

FIG. 16 illustrates a transaction details page 232 with an option 270 to create a hierarchy 272 of tags. The option 270 can be implemented as an interactive drag and drop feature to allow users to add or drag tags into the hierarchical structure in a customized manner. In the example shown in FIG. 16, the tag "groceries" is added under food and "Add tag" options are shown to allow the hierarchy 272 to be further expanded. For example, food can also include "take-out" or "dining", and under groceries, different stores or types of groceries can be tagged to create a richer and more detailed attribution for the tags. It can be appreciated that tags can be added in this way or rearranged based on a baseline of automatically generated tags. The hierarchy 272 can become additional metadata that is fed into the machine learning functionality of the tagging system 10 to train the model 44 and improve tagging over time.

Figure 17:
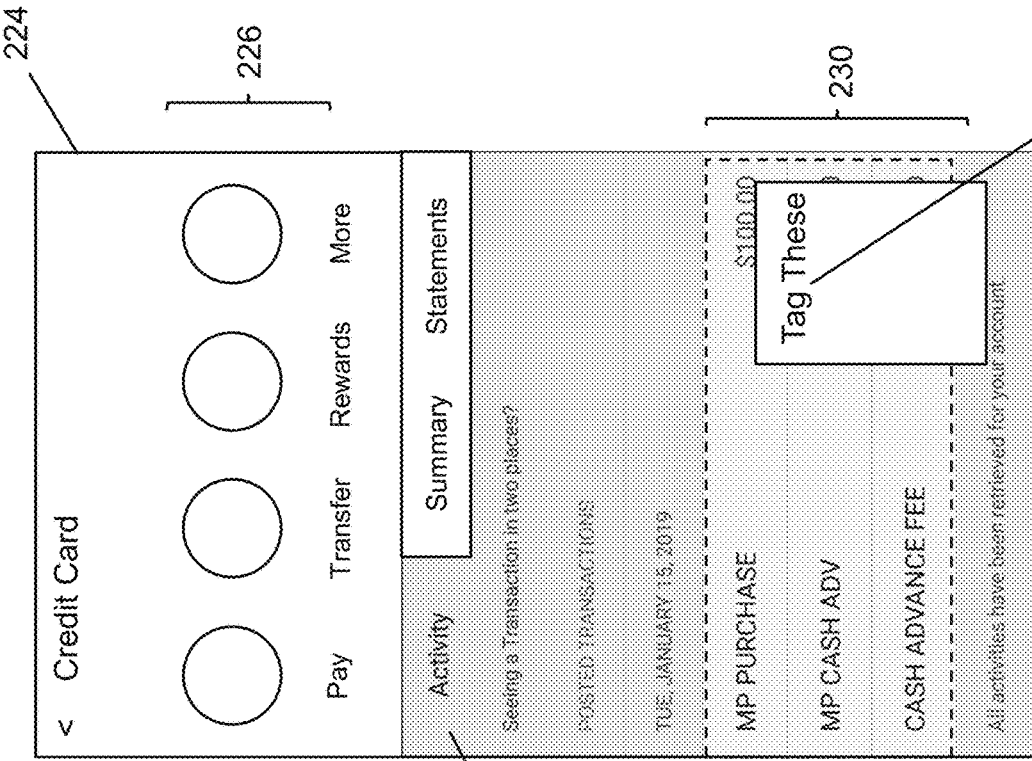
FIG. 17 is an example of a graphical user interface for a transaction details page of a financial institution application showing a tags tab with an option to create a bundled tag.

Referring now to FIG. 17, a transaction details page 224 with an option 280 to create a bundled tag is shown. In this functionality, a user can select multiple transaction entries 230 and invoke a menu with a "tag these" option 280. In this way, any tags added, including hierarchies 272, formulas 148, scripts 150, etc. are applied equally to the bundle of transactions. This provides a convenient way for users to categorize and organize transactions and tags for such transactions.

Figure 18:
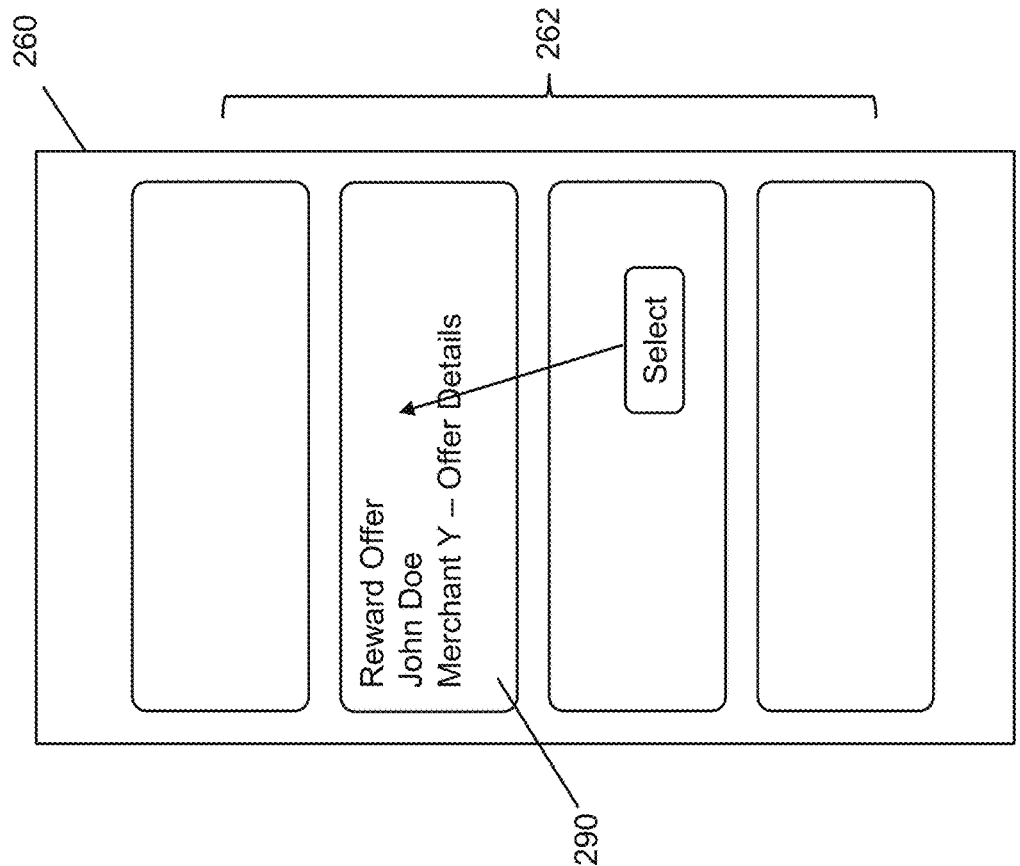
FIG. 18 is an example of a graphical user interface for a notifications view showing a reward offer.

FIG. 18 again shows the notifications view 260, wherein a push notification 290 is provided that includes a reward offer or other promotion or coupon. As discussed above, the auto-tagging services 48 and tagging system 10 more generally, can be leveraged to target rewards, coupons, advertisements and other content to users based on transactions or transaction histories. In this example, by selecting the notification 290 the user can be redirected to an app or webpage associated with a merchant or service.

Figure 19:
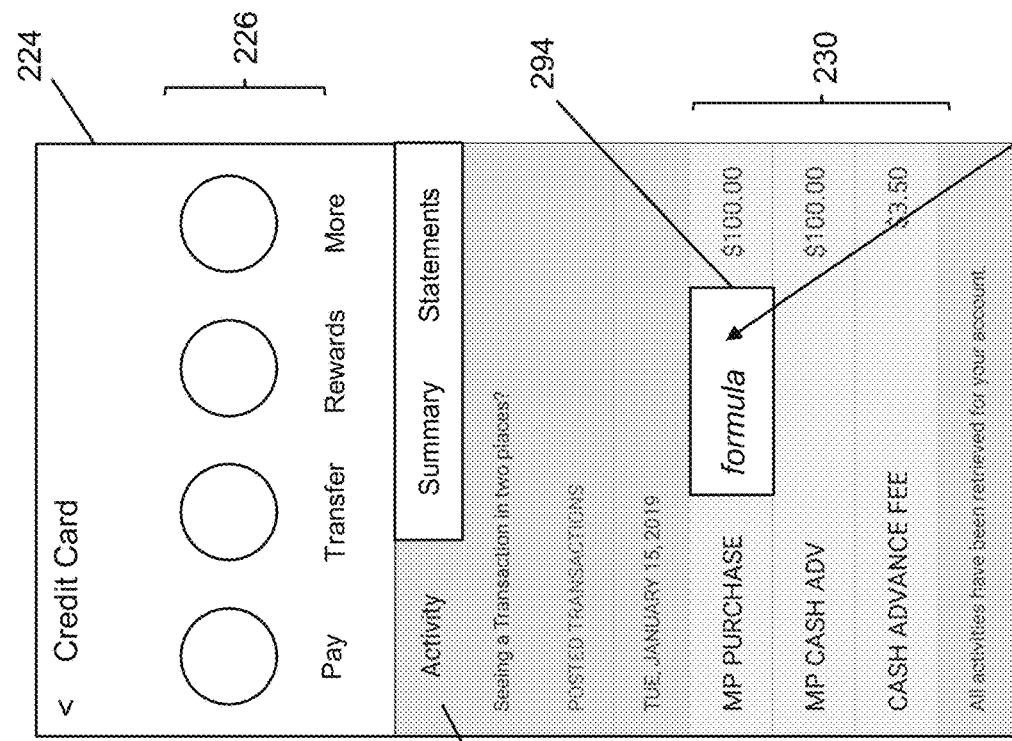
FIG. 19 is an example of a graphical user interface for a transaction details page of a financial institution application with an option to enter a formula in relation to a transaction.

FIG. 19 is an example of a transaction details page 224 with an option 294 to enter a formula 148 in relation to a transaction, illustrating a user interface implementation of what is shown in FIG. 7. In this example, the user can click, tap, or otherwise select the transaction entry 230 to invoke the formula editing functionality 146 described above. It can be appreciated that related options (not shown) can also be invoked, e.g., to add scripts, enter the script editor 160, access the formulas datastore 152 or scripts datastore 174, etc.

Figure 20:
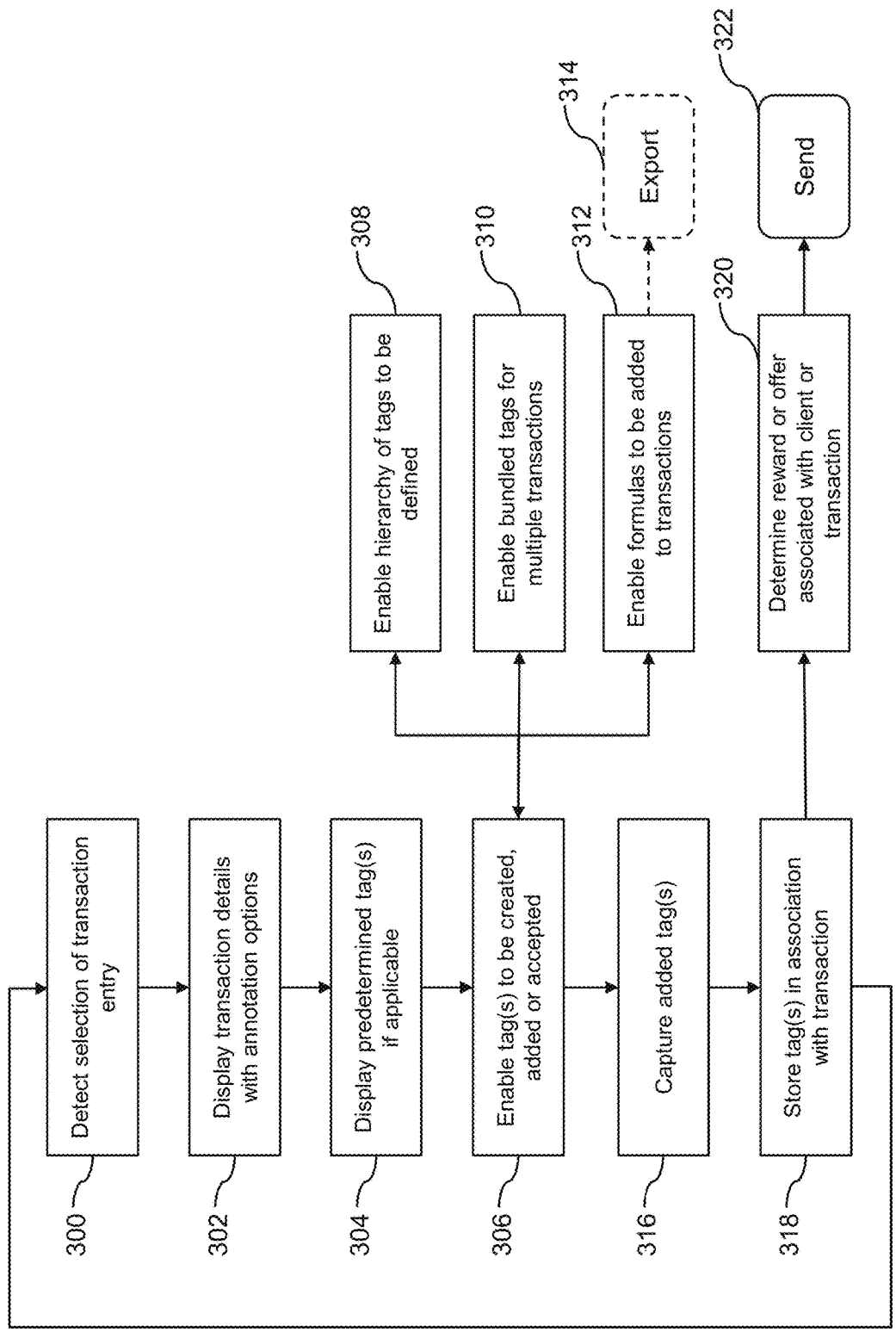
FIG. 20 is a flow diagram of an example of computer executable instructions for adding content to a transaction entry using tags.

Turning now to FIG. 20, an example of computer executable instructions for adding content to a transaction entry using tags, is shown. At block 300, the financial institution app 90 or tagging system 10 detects the selection of a transaction entry. At block 302, the transaction details for that transaction entry are displayed with annotation options, etc. to add nots, tags, documents, etc. Any predetermined or automatically generated tags are displayed at block 304, and the financial institution app 90 or tagging system 10 enable one or more tags to be created, added, or accepted, at block 306.

Figure 21:
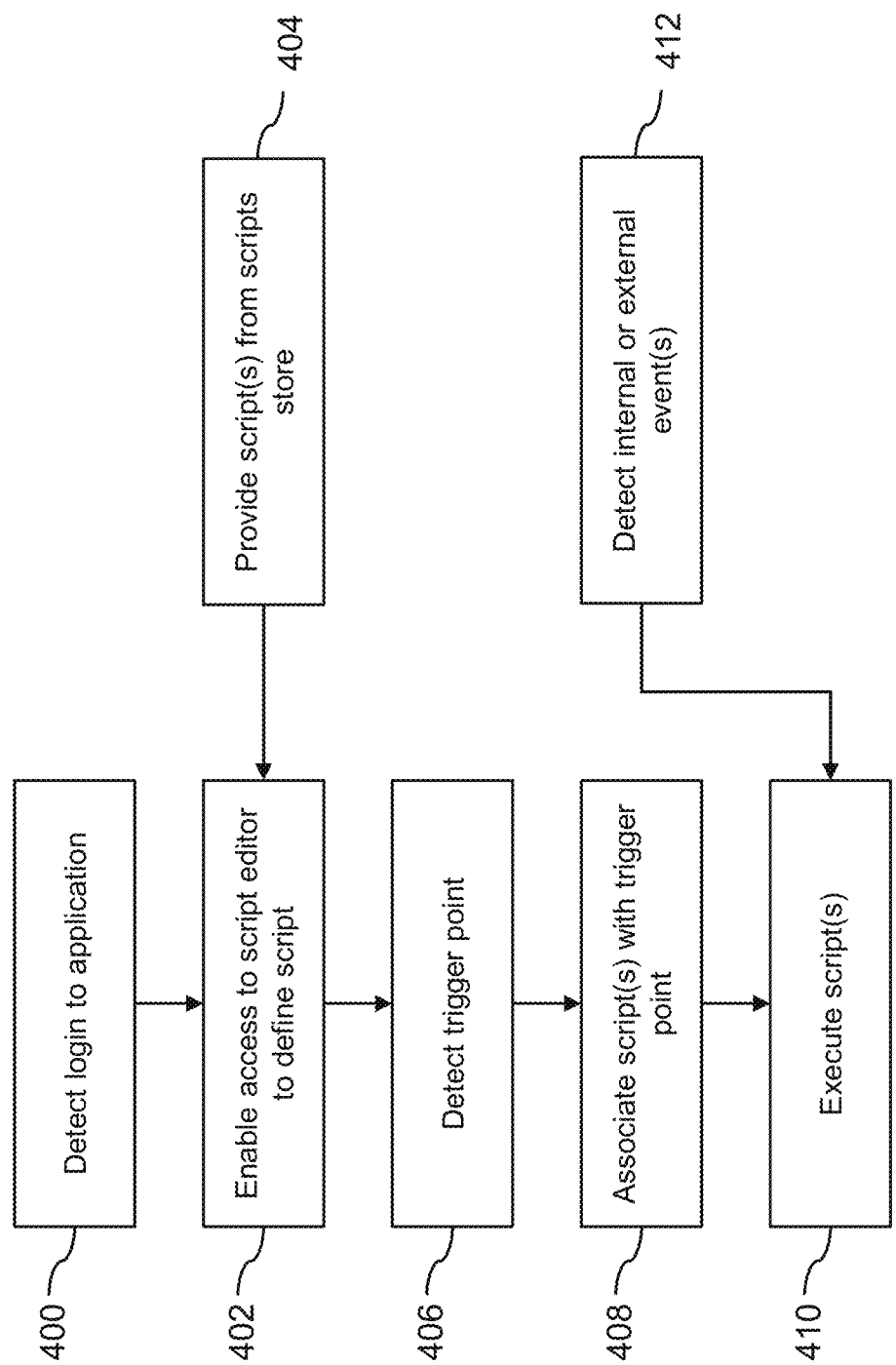
FIG. 21 is a flow diagram of an example of computer executable instructions for executing scripts in relation to events.

In the example shown in FIG. 21, block 306 can lead the user to several options, when available. At block 308 a hierarchy of tags can be defined, at block 310 a bundled tag for multiple transactions can be defined, and at block 312 formulas can be added to transactions by interacting with the formula editing functionality 146. Optionally, as shown in dashed lines, at block 314, the user can export the transaction data with the formula(s) added, e.g., to a spreadsheet program as discussed above.

At block 316, the financial institution app 90 or tagging system 10 capture the added tag(s) and at block 318 stores the tag(s) in association with the transaction. At block 320, the tagging system 10 may determine that a reward, offer, promotion, discount or other content is associated with the client or transaction and can be sent to the user, e.g., to the client device 12 at block 322. The process shown in FIG. 20 can be initiated again upon detecting selection of a transaction entry at block 300.

FIG. 21 illustrates an example of computer executable instructions for executing scripts 150 in relation to events such as transactions. At block 400, the financial institution system 16 detects that a user has logged into the financial institution app 90 and enables access to the script editor 160 at block 402 to enable the user to define a script 150 (e.g., add, create, buy, upload, etc.) As shown, script(s) 150 can be provided from the scripts datastore 174 at block 404. With at least one script 150 having been defined, the scripts engine 166 can be initiated to monitor and detect a trigger point 162 at block 406 and associate the trigger point with one or more scripts 150 at block 408. The associated script(s) may then be executed at block 410. As shown in FIG. 21, an internal or external event 168 can also be detected by the scripts infrastructure at block 412, which can also cause one or more scripts 150 to be executed at block 410.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for automatically tagging data for client devices, the server device comprising:
a processor;
a communications module coupled to the processor; and
a memory coupled to the processor, the memory storing computer executable instructions that when executed by the processor cause the processor to:
receive, by the server device, via the communications module, at least one tag in response to a client device participating in a transaction, the at least one tag from the client device being based on a substance of the transaction and selected from a list of tags comprising at least one other tag automatically determined from stored tag data;

associate the at least one tag with an event associated with the transaction and store the association with the stored tag data associated with a plurality of client devices; and automatically display the at least one tag with the event in a user interface comprising a listing of the event and one or more other events, wherein the user interface is accessible to the client device via a mobile application.

2. The server device of claim 1, wherein the computer executable instructions further cause the processor to:

automatically determine, in response to detecting the event, the at least one other tag;

send, by the server device via the communications module, to the client device, a notification comprising an option to associate tags with the event, the option providing the at least one automatically determined tag; and receive, by the server device via the communications module, from the client device, an indication of the at least one tag in response to an interaction with the notification.

3. The device of claim 2, wherein the option is provided using a push notification sent to the client device during or after a transaction.

4. The device of claim 2, wherein the notification comprising the option to associate tags with the event is provided after detecting that the client device has accessed the user interface comprising the listing of events.

5. The device of claim 1, wherein the computer executable instructions further cause the processor to execute a follow up action comprising sending a targeted message to the client device based on the at least one tag or the event.

6. The device of claim 5, wherein the targeted message comprises a reward, offer, or promotion.

7. The device of claim 6, wherein the computer executable instructions further cause the processor to:

send via the communications module, to an external merchant system, tags associated with the event; and receive via the communications module, from the external merchant system, data augmented with the reward, offer, or promotion, to be provided to the client device.

8. The device of claim 1, wherein the computer executable instructions further cause the processor to execute a follow up action comprising accessing the stored tag data to enable a search of the stored tag data or the listing of events.

9. The device of claim 1, wherein the computer executable instructions further cause the processor to:

enable the client device to apply tags to the event in a hierarchal structure.

10. The device of claim 1, wherein the computer executable instructions further cause the processor to:

enable the client device to associate tags to a bundle of multiple transactions at the same time.

11. The device of claim 2, wherein the computer executable instructions further cause the processor to:

receive via the communications module, from a third party system, at least one suggested tag associated with at least one event type.

12. The device of claim 2, wherein the computer executable instructions further cause the processor to:

conduct a deep search of documents or files to automatically determine the at least one automatically determined tag provided with the option.

13. The device of claim 2, wherein the computer executable instructions further cause the processor to:

automatically determine the at least one automatically determined tag based on users like a user of the client device having tagged similar events using a suggested tag.

14. The device of claim 1, wherein the computer executable instructions further cause the processor to:

provide a formula editing functionality in the user interface in association with one or more event entries.

15. The device of claim 1, wherein the computer executable instructions further cause the processor to:

provide a script editor via the user interface to enable a script to be associated with a trigger point, the script defining one or more operations using event data.

16. A computer implemented method of automatically tagging data for client devices, the method executed by a server device and comprising:

receiving, by the server device, at least one tag in response to a client device participating in a transaction, the at least one tag from the client device being based on a substance of the transaction and selected from a list of tags comprising at least one other tag automatically determined from stored tag data;

associating the at least one tag with an event associated with the transaction and storing the association with the stored tag data associated with a plurality of client devices; and automatically displaying the at least one tag with the event in a user interface comprising a listing of the event and one or more other events, wherein the user interface is accessible to the client device via a mobile application.

17. The method of claim 16, further comprising:

automatically determining, in response to detecting the event, the at least one other tag;

sending, by the server device, to the client device, a notification comprising an option to associate tags with the event, the option providing the at least one automatically determined tag; and receiving, by the server device, from the client device, an indication of the at least one tag in response to an interaction with the notification.

18. The method of claim 16, further comprising sending a targeted message to the client device based on the at least one tag or the event.

19. The method of claim 17, further comprising:

conducting a deep search of documents or files to automatically determine the at least one automatically determined tag provided with the option.

20. A non-transitory computer readable medium for automatically tagging data for client devices by a server device, the computer readable medium comprising computer executable instructions for:

receiving, by the server device, at least one tag in response to a client device participating in a transaction, the at least one tag from the client device being based on a substance of the transaction and selected from a list of tags comprising at least one other tag automatically determined from stored tag data;

associating the at least one tag with an event associated with the transaction and storing the association with the stored tag data associated with a plurality of client devices; and automatically displaying the at least one tag with the event in a user interface comprising a listing of the event and one or more other events, wherein the user interface is accessible to the client device via a mobile application.

* * * * *